US007270386B2

(12) United States Patent
Takahashi et al.

(10) Patent No.: US 7,270,386 B2
(45) Date of Patent: Sep. 18, 2007

(54) LIQUID-DETECTING DEVICE AND LIQUID CONTAINER WITH THE SAME

(75) Inventors: Tomoaki Takahashi, Nagano (JP); Takahiro Katakura, Nagano (JP); Satoshi Shinada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 168 days.

(21) Appl. No.: 10/529,491

(22) PCT Filed: Feb. 10, 2004

(86) PCT No.: PCT/JP2004/001412

§ 371 (c)(1),
(2), (4) Date: Aug. 4, 2005

(87) PCT Pub. No.: WO2004/070326

PCT Pub. Date: Aug. 19, 2004

(65) Prior Publication Data

US 2006/0170718 A1 Aug. 3, 2006

(30) Foreign Application Priority Data

| | | | |
|---|---|---|---|
| Feb. 10, 2003 | (JP) | ............................ | 2003-032596 |
| Mar. 3, 2003 | (JP) | ............................ | 2003-055806 |
| Mar. 3, 2003 | (JP) | ............................ | 2003-055820 |
| Mar. 3, 2003 | (JP) | ............................ | 2003-056009 |
| Mar. 3, 2003 | (JP) | ............................ | 2003-056020 |
| Apr. 11, 2003 | (JP) | ............................ | 2003-107736 |

(51) Int. Cl.

| | |
|---|---|
| ***B41J 2/195*** | (2006.01) |
| ***B41J 2/175*** | (2006.01) |
| ***G01F 23/00*** | (2006.01) |

(52) U.S. Cl. ........................... 347/7; 347/86; 73/290 R

(58) Field of Classification Search .................... 347/7, 347/86; 73/1.48, 1.73, 149, 301, 651, 290 R
See application file for complete search history.

(56) References Cited

U.S. PATENT DOCUMENTS 4,565,942 A 1/1986 Sakai et al.
4,644,789 A * 2/1987 Snyder ..................... 73/290 V (Continued)

FOREIGN PATENT DOCUMENTS

EP 1 053 880 A2 11/2000
EP 1053880 A 11/2000

(Continued)

OTHER PUBLICATIONS

Partial supplementary European search report for Eur. Pat. Appln. 04709762.1 (Jan. 29, 2007).

(Continued)

*Primary Examiner*—Anh T. N. Vo
(74) *Attorney, Agent, or Firm*—Stroock & Stroock & Lavan LLP

(57) ABSTRACT

A first electrode (46) has a main portion (46*a*) covering almost the overall area of a concavity (43) and including a notch (46*c*). A piezoelectric layer (47) has a main portion (47*a*) in a diameter smaller than that of the concavity (43), and the whole thereof is within the concavity area, and almost overall the main portion (47*a*) excluding the part corresponding to the notch (46*c*) is laminated on the first electrode (46). An auxiliary electrode (48) extends from the outside of the concavity area into the inside thereof and a part thereof is positioned within the notch (46*c*) of the first electrode (46) and supports a part of the piezoelectric layer (47). A second electrode (49) has a main portion (49*a*) laminated on the piezoelectric layer (47) and an extension part (49*b*) which extends from there and is connected to the auxiliary electrode (48) within the concavity area. The residual vibration state of a vibration part of a liquid-detecting device can be detected easily and surely, and generation of cracks in the piezoelectric layer can be prevented.

35 Claims, 16 Drawing Sheets

U.S. PATENT DOCUMENTS

| | | | | |
|---|---|---|---|---|
| 5,583,544 | A * | 12/1996 | Stamer et al. | 347/7 |
| 6,036,301 | A | 3/2000 | Amemiya et al. | |
| 6,336,697 | B1 * | 1/2002 | Fukushima | 347/20 |
| 6,470,744 | B1 * | 10/2002 | Usui et al. | 73/290 R |
| 6,536,861 | B1 | 3/2003 | Usui et al. | |
| 6,675,646 | B2 * | 1/2004 | Nishihara | 73/290 V |
| 6,729,184 | B2 | 5/2004 | Tsukada et al. | |
| 2002/0170353 | A1 | 11/2002 | Usui et al. | |

FOREIGN PATENT DOCUMENTS

| | | |
|---|---|---|
| EP | 1 237 204 | 9/2002 |
| JP | 2001-146024 A | 5/2001 |
| JP | 2001-146030 A | 5/2001 |
| JP | 2001-146030 A | 5/2001 |
| JP | 2002-156270 | 5/2002 |
| JP | 2002-219814 A | 8/2002 |
| JP | 2002-283586 | 10/2002 |

OTHER PUBLICATIONS

English translation of an international preliminary report on patentability, from int'l. appln. No. PCT/JP2004/001412, dated Feb. 23, 2006.

International Search Report for PCT/JP2004/001412 (Jun. 8, 2004).

Office Action from Japanese patent appln. no. 2005-504949 (Jul. 3, 2007).

* cited by examiner

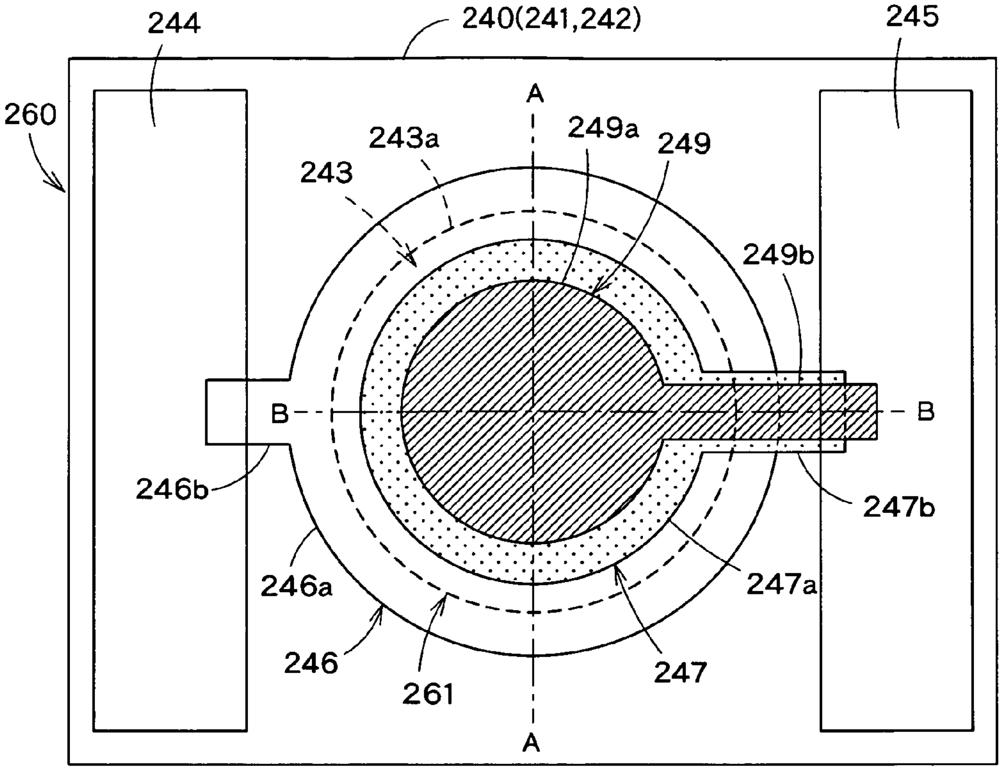
FIG. 10
FIG. 11A
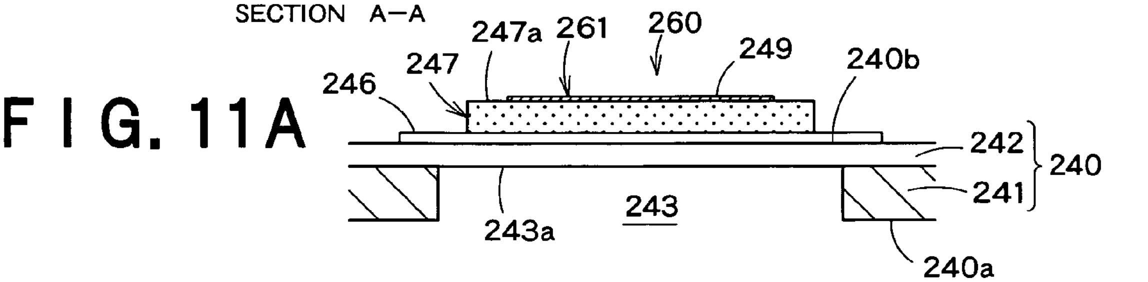
FIG. 11B
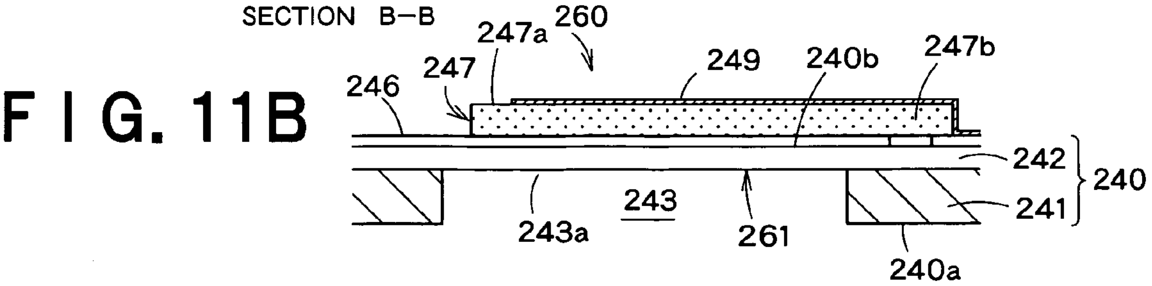

SECTION A—A

SECTION B—B

LIQUID-DETECTING DEVICE AND LIQUID CONTAINER WITH THE SAME

TECHNICAL FIELD

The present invention relates to a liquid-detecting device and a liquid container having the liquid-detecting device, and more particularly to a liquid-detecting device and a liquid container having the liquid-detecting device suitable for detection of a liquid residue of a liquid ejecting apparatus.

BACKGROUND ART

As a typical example of a conventional liquid ejecting apparatus, there is an ink jet recording apparatus having an ink jet recording head for image recording. As other liquid ejecting apparatuses, for example, an apparatus having a coloring material ejecting head used to manufacture color filters such as a liquid crystal display, an apparatus having an electrode material (conductive paste) ejecting head used to form electrodes such as an organic EL display and a face emission display, an apparatus having a biological organic substance ejecting head used to manufacture biological chips, and an apparatus having a sample ejecting head as a precise pipette may be cited.

In the ink jet recording apparatus which is a typical example of the liquid ejecting apparatus, an ink jet recording head having a pressure generation means for pressurizing a pressure generation chamber and a nozzle opening for jetting pressurized ink as ink drops is loaded in a carriage.

In the ink jet recording apparatus, ink in an ink container is continuously fed to a recording head via a flow path, thus printing can be continued. The ink container is formed as a removable cartridge which can be exchanged by a user, for example, at the point of time when ink is consumed.

Conventionally, as a method for controlling ink consumption in the ink cartridge, there are a control method for totalizing the number of jets of ink drops by the recording head and the ink amount sucked in by maintenance by the software, thereby calculating the ink consumption and a method for controlling ink at the point of time when a predetermined amount of ink is actually consumed by an electrode for liquid level detection which is attached to the ink cartridge.

However, the method for totalizing the jet count and ink amount of ink drops by the software and calculating the ink consumption has a problem as indicated below. Some heads have variations in weight in jetted ink drops. Although weight variations of ink drops do not affect the image quality, in consideration of cumulative errors of the ink consumption due to variations, an amount of ink given a margin is filled in the ink cartridge. Therefore, a problem arises that in some individual, the margin of ink may be left over.

On the other hand, the method for controlling the point of time of ink consumption by the electrode can detect the actual amount of ink, so that the ink residue can be controlled highly reliably. However, the detection of the ink level depends on the conductivity of ink, so that there are defects that the kind of detectable ink is limited and the seal structure of the electrode is complicated. Further, as a material of the electrode, a noble metal which is conductive and corrosion resistant is generally used, so that the manufacturing cost of ink cartridges is increased. Furthermore, two electrodes must be mounted, so that the manufacturing steps are increased and as a result, the manufacturing cost is increased.

The apparatus developed to solve the aforementioned problems is disclosed as a piezoelectric device in Japanese Patent Application 2001-146024. This piezoelectric device can accurately detect the liquid residue and requires no complicated seal structure, so that it can be mounted and used in a liquid container.

Namely, according to the piezoelectric device described in Japanese Patent Application 2001-146024, using that the resonance frequency of a residual vibration signal generated due to a residual vibration (a free vibration) of the vibration part of the piezoelectric device forcibly vibrated by a driving pulse is changed between a case that there is ink in the space opposite to the vibration part of the piezoelectric device and a case that there is no ink (or little ink), the ink residue in the ink cartridge can be monitored.

FIGS. 24A, 24B, and 24C show an actuator constituting the aforementioned piezoelectric device. An actuator 106 has a substrate 178 having a circular opening 161 at almost the center thereof, a vibration plate 176 arranged on one surface (hereinafter, referred to as the surface) of the substrate 178 so as to cover the opening 161, a piezoelectric layer 160 arranged on the side of the surface of the vibration plate 176, an upper electrode 164 and a lower electrode 166 holding the piezoelectric layer 160 on both sides thereof, an upper electrode terminal 168 electrically joining to the upper electrode 164, a lower electrode terminal 170 electrically joining to the lower electrode 166, and an auxiliary electrode 172 arranged between the upper electrode 164 and the upper electrode terminal 168 for electrically joining the two.

The piezoelectric layer 160, the upper electrode 164, and the lower electrode 166 respectively have a circular part which is a main portion thereof. And, the respective circular parts of the piezoelectric layer 160, the upper electrode 164, and the lower electrode 166 form piezoelectric elements.

The vibration plate 176 is formed on the surface of the substrate 178 so as to cover the opening 161. A cavity 162 is formed by the part of the vibration plate 176 opposite to the opening 161 and the opening 161 of the substrate (the cavity forming member) 178. The surface (hereinafter, referred to as the rear) of the substrate 178 on the opposite side of the piezoelectric device faces on the inside of the ink container. Therefore, the cavity 162 is formed so as to make contact with a liquid (ink). Further, even if a liquid enters inside the cavity 162, to prevent it from leaking on the surface side of the substrate 178, the vibration plate 176 is attached liquid-tightly to the substrate 178.

The lower electrode 166 is positioned on the surface of the vibration plate 176. The center of the circular part which is the main portion of the lower electrode 166 and the center of the opening 161 are attached so as to coincide with each other. Further, on the surface side of the lower electrode 166, the piezoelectric layer 160 is arranged and formed so that the center of the circular part coincides with the center of the opening 161.

And, in the actuator (piezoelectric device) 106 by the related art, the size (area) of the circular part of the lower electrode 166 is preset so as to be smaller than the size (area) of the opening 161, and the overall circular part of the lower electrode 166 is arranged within the area corresponding to the opening 161. Further, the area of the circular part of the piezoelectric layer 160 is preset so as to be smaller than the area of the opening 161 and larger than the area of the circular part of the lower electrode 166.

On the surface side of the piezoelectric layer 160, the upper electrode 164 is arranged and formed so that the center of the circular part which is the main portion thereof coincides with the center of the opening 161. The area of the circular part of the upper electrode 164 is preset so as to be smaller than the areas of the opening 161 and of the circular part of the piezoelectric layer 160 and so as to be larger than the area of the circular part of the lower electrode 166.

Therefore, the main portion of the piezoelectric layer 160 is structured so as to be held by the main portion of the upper electrode 164 and the main portion of the lower electrode 166 respectively on the surface side and rear side thereof. The circular parts of the upper electrode 164 and the lower electrode 166 which are respectively the main portions form the piezoelectric element of the actuator 106. The piezoelectric element is in contact with the vibration plate 176.

By use of such a structure, the vibration area of the vibration plate 176 which vibrates actually is decided by the opening 161. Further, among the circular part of the lower electrode 166 and the circular part of the upper electrode 164 which are electrically connected to the piezoelectric layer 160, the circular part of the lower part 166 is smaller, so that the circular part of the lower electrode 166 decides a part of the piezoelectric layer 160 producing the piezoelectric effect.

As described above, in the actuator 106 (piezoelectric device) by the related art, among the circular main portion of the upper electrode 164, the circular main portion of the piezoelectric layer 160, the circular main portion of the lower electrode 166, and the circular opening 161, the opening 161 has the largest area, and the main portion of the piezoelectric player 160 has the next largest area, and the main portion of the upper electrode 164 has the next largest area, and the main portion of the lower electrode 166 has the smallest area.

And, in the aforementioned actuator 106 by the related art, the residual vibration (free vibration) of the vibration part generated after the driving pulse is applied to the piezoelectric element and the vibration part is forcibly vibrated is detected as counter electromotive force by the same piezoelectric element. And, using that the residual vibration state of the vibration part is changed before and after the liquid level in the ink container passes the installation position (strictly speaking, the position of the cavity 162) of the actuator 106, the residual ink amount in the ink container can be detected.

However, in the aforementioned conventional liquid-detecting device (piezoelectric device), there are problems imposed as mentioned below.

Firstly, the output of the counter electromotive force generated in the piezoelectric element by the residual vibration of the vibration part of the liquid-detecting device is small, so that it is difficult to detect the counter electromotive force. The reason seems to be that the deformed shape (the deformation mode) of the vibration part when the driving pulse is applied to the piezoelectric element and the vibration part is forcibly vibrated and the deformed shape (the deformation mode) of the vibration part at the time of free vibration after forcible deformation are greatly different from each other.

Secondly, a problem arises that during free vibration of the vibration part after forcible deformation, other than the vibration frequency necessary as a detection object, an unnecessary high order of vibration mode is excited. Particularly, when the lower electrode is displaced in the vibration part due to manufacture variations, an unnecessary vibration is increased and the vibration frequency may not be detected or may not be detected correctly.

Further, as shown in FIGS. 24A, 24B, and 24C, in the conventional liquid-detecting device (piezoelectric device), a part of the hard and fragile piezoelectric film 160 is extended toward the upper electrode terminal 168 so as to cross the periphery of the cavity 162. Therefore, a problem arises that the piezoelectric film 160 may be cracked at a position corresponding to the periphery of the cavity 162.

DISCLOSURE OF INVENTION

The present invention has been developed with the foregoing in view and is intended to provide a liquid-detecting device capable of easily and surely detecting the residual vibration state of the vibration part and a liquid container having the liquid-detecting device.

Further, the present invention is intended to provide a liquid-detecting device capable of preventing generation of cracks in the piezoelectric layer and a liquid container having the liquid-detecting device.

To solve the aforementioned problems, the liquid-detecting device of the present invention comprises: a base having a first face and a second face opposite to each other, the base being provided with a concavity configured to receive a medium to be detected, the concavity being formed so as to be opened on a side of the first face, the concavity having a bottom configured to be capable of vibrating; a first electrode formed on a side of the second face of the base, the first electrode having a main portion formed in a size larger than the bottom of the concavity so as to cover an almost overall area corresponding to the bottom of the concavity, the main portion including a notch formed so as to extend inward over a position corresponding to a periphery of the bottom of the concavity; a piezoelectric layer having a main portion formed in a size smaller than the bottom of the concavity, a whole of the piezoelectric layer being arranged within the area corresponding to the bottom of the concavity, an almost overall the main portion of the piezoelectric layer excluding a part corresponding to the notch of the first electrode being laminated on the first electrode; an auxiliary electrode formed on a side of the second face of the base so as to extend from an outside of the area corresponding to the bottom of the concavity to an inside of the area corresponding to the bottom of the concavity, a part of the auxiliary electrode being positioned within the notch of the first electrode and supporting a part of the piezoelectric layer from the side of the second face; and a second electrode having a main portion laminated on the piezoelectric layer and an extension part extending from the main portion of the second electrode so as to be connected to the auxiliary electrode within the area corresponding to the bottom of the concavity.

Preferably, the piezoelectric layer has a projection projected from the main portion of the piezoelectric layer within the area corresponding to the bottom of the concavity, the projection being supported by the auxiliary electrode.

Preferably, the main portion of the second electrode is formed in a size smaller than the main portion of the piezoelectric layer.

Preferably, the main portion of the piezoelectric layer and the main portion of the second electrode are formed in an almost symmetrical form having at least one symmetrical common axis.

Preferably, the main portion of the piezoelectric layer and the main portion of the second electrode are all circular and are arranged coaxially with each other.

To solve the aforementioned problems, the liquid-detecting device of the present invention comprises: a base having a first face and a second face opposite to each other, the base being provided with a concavity configured to receive a medium to be detected, the concavity being formed so as to be opened on a side of the first face, the concavity having a bottom configured to be capable of vibrating; a first electrode formed in a size larger than the bottom of the concavity on a side of the second face of the base so as to cover an overall area corresponding to the bottom of the concavity; a piezoelectric layer having a main portion formed in a size smaller than the bottom of the concavity, the main portion of the piezoelectric layer being laminated on the first electrode within the area corresponding to the bottom of the concavity; and a second electrode having a main portion laminated on the main portion of the piezoelectric layer.

Preferably, the piezoelectric layer additionally has an extension part extending from the main portion of the piezoelectric layer up to an outside of the area corresponding to the bottom of the concavity beyond a position corresponding to a periphery of the concavity.

Preferably, the main portion of the second electrode is formed in a size smaller than the main portion of the piezoelectric layer.

Preferably, the second electrode additionally has an extension part extending from the main portion of the second electrode over the extension part of the piezoelectric layer up to the outside of the area corresponding to the bottom of the concavity.

Preferably, the main portion of the piezoelectric layer and the main portion of the second electrode are formed in an almost symmetrical form having at least one symmetrical common axis.

Preferably, the concavity, the main portion of the piezoelectric layer, and the main portion of the second electrode are all circular and are arranged coaxially with each other.

Preferably, the above-mentioned liquid-detecting device further comprises an insulating layer arranged between the extension part of the second electrode and the piezoelectric layer.

To solve the aforementioned problems, the liquid-detecting device of the present invention comprises: a base having a first face and a second face opposite to each other, the base being provided with a concavity configured to receive a medium to be detected, the concavity being formed so as to be opened on a side of the first face, the concavity having a bottom configured to be capable of vibrating; a first electrode formed in a size larger than the bottom of the concavity on a side of the second face of the base so as to cover an overall area corresponding to the bottom of the concavity; a piezoelectric layer having a main portion formed in a size larger than the bottom of the concavity, the main portion of the piezoelectric layer being laminated on the first electrode so as to cover the overall area corresponding to the bottom of the concavity; and a second electrode having a main portion formed in a size smaller than the bottom of the concavity, the main portion of the second electrode being laminated on the main portion of the piezoelectric layer within the area corresponding to the bottom of the concavity.

Preferably, the main portion of the piezoelectric layer is formed in a size smaller than the main portion of the first electrode.

Preferably, the piezoelectric layer additionally has an extension part extending from the main portion of the piezoelectric layer. The second electrode additionally has an extension part extending from the main part of the second electrode over the main portion of the piezoelectric layer and the extension part of the piezoelectric layer.

Preferably, the main portion of the piezoelectric layer and the main portion of the second electrode are formed in an almost symmetrical form having at least one symmetrical common axis.

Preferably, the concavity and the main portion of the second electrode are all circular and are arranged coaxially with each other.

Preferably, the above-mentioned liquid-detecting device further comprises an insulating layer arranged between the extension part of the second electrode and the piezoelectric layer.

To solve the aforementioned problems, the liquid-detecting device of the present invention comprises: a base having a first face and a second face opposite to each other, the base being provided with a concavity configured to receive a medium to be detected, the concavity being formed so as to be opened on a side of the first face, the concavity having a bottom configured to be capable of vibrating; a first electrode having a main portion formed in a size smaller than the bottom of the concavity on a side of the second face of the base, the main portion of the first electrode being arranged inside an area corresponding to the bottom of the concavity; a piezoelectric layer having a main portion formed in a size smaller than the main portion of the first electrode, the main portion of the piezoelectric layer being laminated on the main portion of the first electrode; and a second electrode having a main portion formed in a size smaller than the main portion of the piezoelectric layer, the main portion of the second electrode being laminated on the main portion of the piezoelectric layer.

Preferably, the first electrode additionally has an extension part extending from the main portion of the first electrode up to an outside of the area corresponding to the bottom of the concavity. The piezoelectric layer additionally has an extension part extending from the main portion of the piezoelectric layer up to the outside of the area corresponding to the bottom of the concavity. The second electrode additionally has an extension part extending from the main portion of the second electrode over the main portion of the piezoelectric layer and the extension part of the piezoelectric layer.

Preferably, the concavity and the main portion of the first electrode are all circular and are arranged coaxially with each other. A diameter of the main portion of the first electrode is equal to or more than 75% of a diameter of the concavity.

To solve the aforementioned problems, the liquid-detecting device of the present invention comprises: a base having a first face and a second face opposite to each other, the base being provided with a concavity configured to receive a medium to be detected, the concavity being formed so as to be opened on a side of the first face, the concavity having a bottom configured to be capable of vibrating; a first electrode formed in a size larger than the bottom of the concavity on a side of the second face of the base so as to cover an overall area corresponding to the bottom of the concavity; a piezoelectric layer having a main portion formed in a size larger than the bottom of the concavity, the main portion of the piezoelectric layer being laminated on the first electrode so as to cover the overall area corresponding to the bottom of the concavity; and a second electrode having a annular main portion which has an outer diameter formed in a size smaller than the bottom of the concavity, the annular main portion being laminated on the main portion of the piezoelectric layer within the area corresponding to the bottom of the concavity.

Preferably, the main portion of the piezoelectric layer is formed in a size smaller than the main portion of the first electrode.

Preferably, the piezoelectric layer additionally has an extension part extending from the main portion of the piezoelectric layer. The second electrode additionally has an extension part extending from the main part of the second electrode over the main portion of the piezoelectric layer and the extension part of the piezoelectric layer.

Preferably, the main portion of the piezoelectric layer and the main portion of the second electrode are formed in an almost symmetrical form having at least one symmetrical common axis.

Preferably, the concavity is circular, and the main portion of the second electrode is in a circular ring shape, and the concavity and the main portion of the second electrode are arranged coaxially with each other.

To solve the aforementioned problems, the liquid-detecting device of the present invention comprises: a base having a first face and a second face opposite to each other, the base being provided with a concavity configured to receive a medium to be detected, the concavity being formed so as to be opened on a side of the first face, the concavity having a bottom configured to be capable of vibrating; a first electrode formed on a side of the second face of the base, the first electrode having a main portion and an extension part, the main portion being formed in a size smaller than the bottom of the concavity and arranged within an area corresponding to the bottom of the concavity, the extension part extending from the main part of the first electrode up to an outside of the area corresponding to the bottom of the concavity; a piezoelectric layer formed in a size smaller than the bottom of the concavity, the piezoelectric layer being laminated on the first electrode, a whole of the piezoelectric layer being arranged within the area corresponding to the bottom of the concavity; an auxiliary electrode formed on the side of the second face of the base, the auxiliary electrode extending from the outside of the area corresponding to the bottom of the concavity to an inside of the area corresponding to the bottom of the concavity, a part of the auxiliary electrode supporting a part of the piezoelectric layer from the side of the second face; and a second electrode having a main portion laminated on the piezoelectric layer and an extension part extending from the main portion of the second electrode so as to be connected to the auxiliary electrode within the area corresponding to the bottom of the concavity.

Preferably, the size of the main portion of the first electrode is smaller than the size of the piezoelectric layer, and a size of the main portion of the second electrode is larger than the size of the main portion of the first electrode.

Preferably, a size of the main portion of the second electrode is smaller than the size of the piezoelectric layer.

Preferably, the extension part of the first electrode and the extension part of the second electrode extend mutually in opposite directions along a first straight line passing a center of the concavity. The first electrode additionally has a pair of extension parts mutually extending from the main portion of the first electrode in opposite directions along a second straight line which passes the center of the concavity and intersects the first straight line orthogonally.

Preferably, the pair of extension parts and the main portion of the first electrode are separated from each other.

Preferably, the main portion of the first electrode, the main portion of the piezoelectric layer, and the main portion of the second electrode are all circular and arranged coaxially with each other.

To solve the aforementioned problems, the liquid-detecting device of the present invention comprises: a container body for storing a liquid; and any of the aforementioned liquid-detecting devices. The concavity of the liquid-detecting device is exposed in a liquid storage space of the container body.

Preferably, a liquid for a liquid ejecting apparatus is stored in the container body.

Preferably, the liquid ejecting apparatus is an ink jet recording apparatus and ink is stored in the container body.

According to the liquid-detecting device of the present invention having the aforementioned constitution and the liquid container having the liquid-detecting device, changes in the residual vibration state of the vibration part of the liquid-detecting device can be detected easily and surely.

Further, according to the liquid-detecting device of the present invention and the liquid container having the liquid-detecting device, generation of cracking in the piezoelectric layer can be prevented surely.

BRIEF DESCRIPTION OF DRAWINGS

FIG. 3A is a sectional view along the line A-A shown in FIG. 2, and FIG. 3B is a sectional view along the line B-B shown in FIG. 2.

FIG. 10 is a plan view showing a liquid-detecting device of an embodiment of the present invention.

FIGS. 11A and 11B are vertical sectional views showing an enlarged part of the liquid-detecting device shown in FIG. 10, and FIG. 11A is a sectional view along the line A-A shown in FIG. 10, and FIG. 11B is a sectional view along the line B-B shown in FIG. 10.

FIG. 14A is a sectional view along the line A-A shown in FIG. 13, and FIG. 14B is a sectional view along the line B-B shown in FIG. 13.

FIG. 17A is a sectional view along the line A-A shown in FIG. 16, and FIG. 17B is a sectional view along the line B-B shown in FIG. 16.

FIG. 19A is a sectional view along the line A-A shown in FIG. 18, and FIG. 19B is a sectional view along the line B-B shown in FIG. 18.

FIG. 21A is a sectional view along the line A-A shown in FIG. 20, and FIG. 21B is a sectional view along the line B-B shown in FIG. 20.

FIG. 23A is a sectional view along the line A-A shown in FIG. 22, and FIG. 23B is a sectional view along the line B-B shown in FIG. 22.

BEST MODE FOR CARRYING OUT THE INVENTION

Hereinafter, a liquid-detecting device of an embodiment of the present invention and an ink cartridge (a liquid container) having the liquid-detecting device will be explained with reference to the accompanying drawings.

Figure 1:
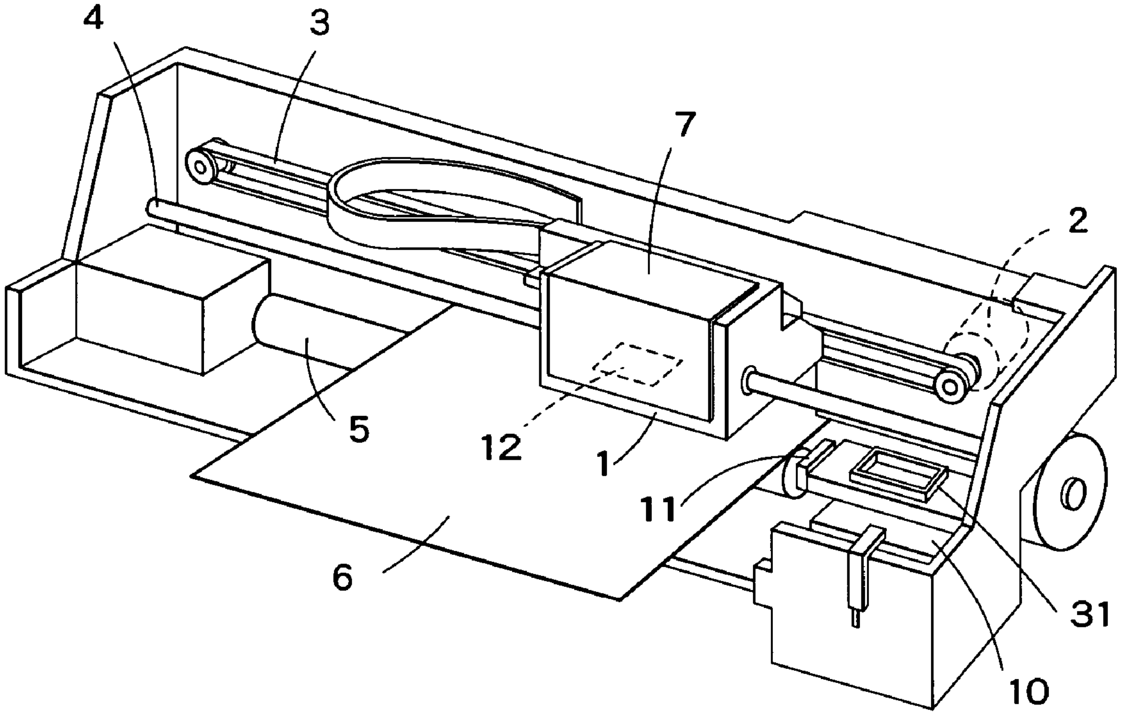
FIG. 1 is a perspective view showing the schematic constitution of an ink jet recording apparatus using an ink cartridge having a liquid-detecting device of an embodiment of the present invention.

FIG. 1 shows a schematic constitution of an ink jet recording apparatus (a liquid ejecting apparatus) using the ink cartridge of this embodiment, and in FIG. 1, numeral 1 indicates a carriage, and the carriage 1 is structured so as to be guided by a guide member 4 via a timing belt 3 driven by a carriage motor 2 and move back and forth in the axial direction of a platen 5.

On the side of the carriage 1 opposite to a recording form 6, an ink jet recording head 12 is loaded and above it, an ink cartridge 7 for feeding ink to the recording head 12 is mounted removably.

In the home position (on the right of the drawing) which is a non-printing area of the recording apparatus, a cap member 31 is arranged and the cap member 31 is structured, when the recording head loaded on the carriage 1 moves to the home position, so as to be pressed against the nozzle forming face of the recording head and form a closed space between the same and the nozzle forming face. And, under the cap member 31, a pump unit 10 for applying a negative pressure to the closed space formed by the cap member 31 and executing cleaning is arranged.

And, in the neighborhood of the cap member 31 in the printing area, a wiping means 11 having an elastic plate such as rubber is arranged so as to move back and forth, for example, horizontally for the moving track of the recording head and it is structured, when the carriage 1 moves back and forth on the side of the cap member 31, so as to wipe the nozzle forming face of the recording head as required.

Figure 2:
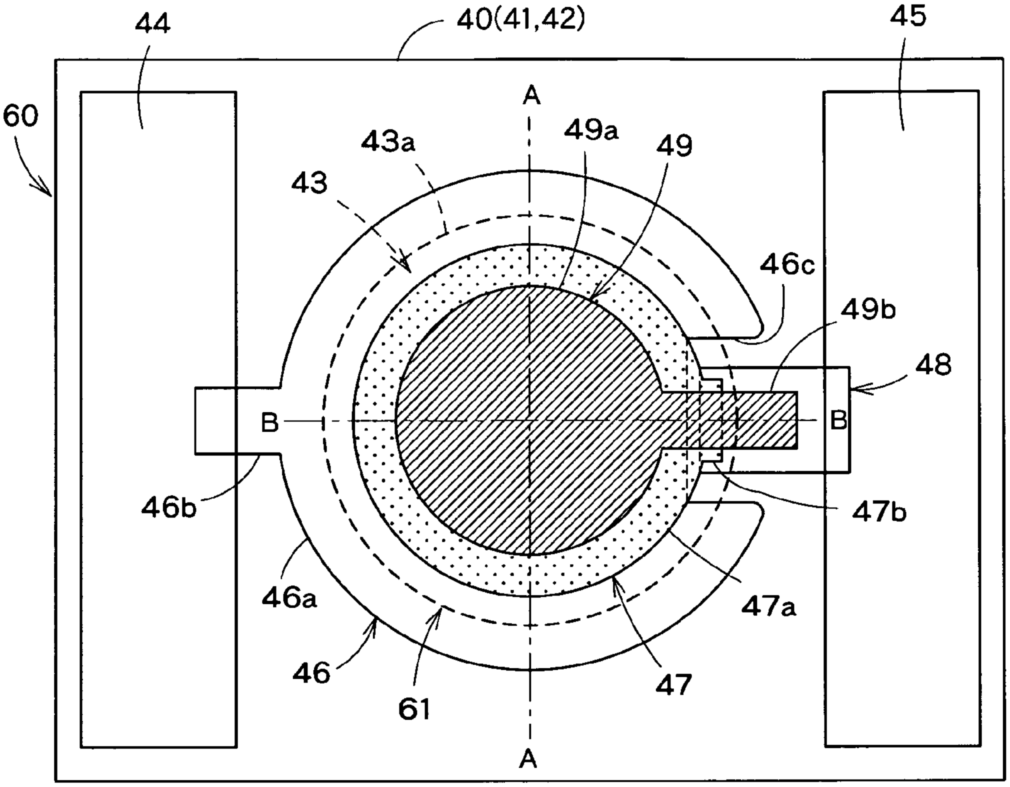
FIG. 2 is a plan view showing the liquid-detecting device of an embodiment of the present invention.
Figure 3A:
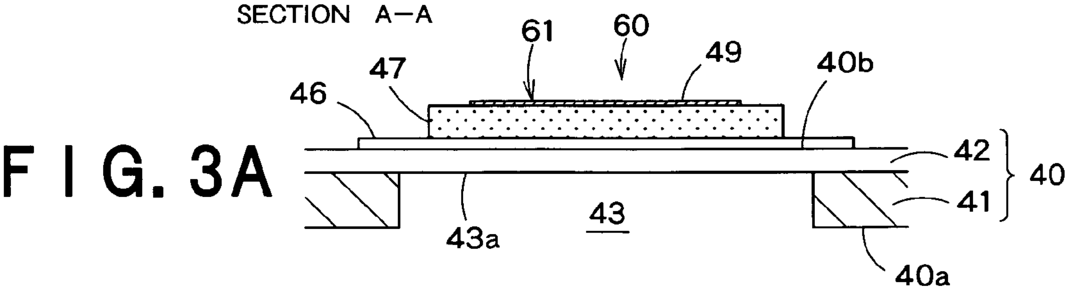
FIGS. 3A and 3B are vertical sectional views showing an enlarged part of the liquid-detecting device shown in FIG. 2.
Figure 3B:
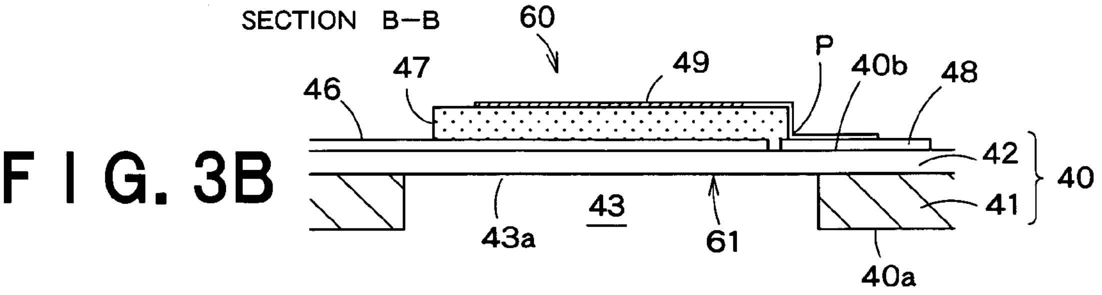

FIGS. 2, 3A, and 3B are drawings showing a liquid-detecting device 60 of this embodiment, and the liquid-detecting device 60 has a base 40 formed by laminating a vibration plate 42 on a substrate 41, and the base 40 has a first face 40*a* and a second face 40*b* opposite to each other. On the base 40, a circular cavity (concavity) 43 for receiving a medium to be detected is formed so as to be opened on the side of the first face 40*a* and a bottom 43*a* of the cavity 43 is configured to be capable of vibrating by the vibration plate 42. In other words, the part of the overall vibration plate 42 which vibrates actually is defined at the contour thereof by the cavity 43. At both ends of the base 40 on the side of the second face 40*b*, a lower electrode terminal 44 and an upper electrode terminal 45 are formed.

On the second face 40*b* of the base 40, a lower electrode (first electrode) 46 is formed and the lower electrode 46 has an almost circular main portion 46*a* and an extension part 46*b* which extends from the main portion 46*a* toward the lower electrode terminal 44 and is connected to the lower electrode terminal 44. The center of the almost circular main portion 46*a* of the lower electrode 46 coincides with the center of the cavity 43.

The almost circular main portion 46*a* of the lower electrode 46 is formed in a diameter larger than that of the circular cavity 43 and covers almost overall the area corresponding to the cavity 43. Further, the almost circular main portion 46*a* of the lower electrode 46 includes a notch 46*c* formed so as to extend inward over the position corresponding to the periphery 43*a* of the cavity 43.

On the lower electrode 46, a piezoelectric layer 47 is laminated and the piezoelectric layer 47 has a circular main portion 47*a* formed in a diameter smaller than that of the cavity 43 and a projection 47*b* projected from the main portion 47*a* within the area corresponding to the cavity 43. As shown in FIG. 2, the overall piezoelectric layer 47 is within the area corresponding to the cavity 43. In other words, the cavity 43 has no part at all crossing and extending the position corresponding to the periphery 43*a* of the cavity 43.

The center of the main portion 47*a* of the piezoelectric layer 47 coincides with the center of the cavity 43 and the almost overall main portion 47*a* of the piezoelectric layer 47, excluding the part corresponding to the notch 46*c* of the lower electrode 46, is laminated on the lower electrode 46.

On the side of the second face 40*b* of the base 40, an auxiliary electrode 48 is formed. The auxiliary electrode 48 extends from the outside of the area corresponding to the cavity 43 into the area corresponding to the cavity 43 beyond the position corresponding to the periphery 43*a* of the cavity 43. A part of the auxiliary electrode 48 is positioned inside the notch 46*c* of the first electrode 46 and supports the extension part 47*b* of the piezoelectric layer 47 and its vicinity from the side of the second face 40*b* of the base 40. The auxiliary electrode 48 preferably has the same material and same thickness as those of the lower electrode 46. Since the extension part 47*b* of the piezoelectric layer 47 and its vicinity are supported from the side of the second face 40*b* of the base 40 by the auxiliary electrode 48 like this, the piezoelectric layer 47 is prevented from generation of a level different portion, thus the mechanical strength can be prevented from reduction.

On the piezoelectric layer 47, a circular main portion 49*a* of an upper electrode (second electrode) 49 is laminated and the upper electrode 49 is formed in a diameter smaller than that of the main portion 47*a* of the piezoelectric layer 47. Further, the upper electrode 49 has an extension part 49*b* which extends from the main portion 49*a* and is connected to the auxiliary electrode 48. As shown in FIG. 3*b*, the position P where the extension part 49*b* of the upper electrode 49 and the auxiliary electrode 48 begin to connect is within the area corresponding to the cavity 43.

As shown in FIG. 2, the upper electrode 49 is electrically connected to the upper electrode terminal 45 via the auxiliary electrode 48. Since the upper electrode 49 is electrically connected to the upper electrode terminal 45 via the auxiliary electrode 48 like this, the level difference caused by the total thickness of the piezoelectric layer 47 and the lower electrode 46 can be absorbed by both the upper electrode 49 and the auxiliary electrode 48. Therefore, it can be prevented that a great level difference is caused in the upper electrode 49 so that the mechanical strength is reduced.

The main portion 49*a* of the upper electrode 49 is circular and the center thereof coincides with the center of the cavity 43. The main portion 49*a* of the upper electrode 49 is formed in a diameter smaller than those of the main portion 47*a* of the piezoelectric layer 47 and the cavity 43.

As mentioned above, the main portion 47*a* of the piezoelectric layer 47 is structured so as to be held by the main portion 49*a* of the upper electrode 49 and the main portion 46*a* of the lower electrode 46. By doing this, the piezoelectric layer 47 can be driven to effectively deform.

Further, among the main portion 46*a* of the lower electrode 46 and the main portion 49*a* of the upper electrode 49 which are electrically connected to the piezoelectric layer 47, the main portion 49*a* of the upper electrode 49 is formed in a smaller diameter. Therefore, the main portion 49*a* of the upper electrode 49 decides the area of the part of the piezoelectric layer 47 where the piezoelectric effect is produced.

Further, the members included in the liquid-detecting device 60 are preferably formed integrally with each other by mutual calcination. When the liquid-detecting device 60 is integrally formed like this, the liquid-detecting device 60 can be handled easily.

As a material of the piezoelectric layer 47, it is preferable to use zirconium acid titanate (PZT), zirconium acid titanate lantern (PLZT), or a lead-less piezoelectric film using no lead. As a material of the substrate 41, it is preferable to use zirconia or alumina. Further, the vibration plate 42 preferably uses the same material as that of the substrate 41. The upper electrode 49, the lower electrode 46, the upper electrode terminal 45, and the lower electrode terminal 44 can be made with a conductive material, for example, metals of gold, silver, copper, platinum, aluminum, and nickel.

With respect to the main portion 47*a* of the piezoelectric layer 47, the main portion 49*a* of the upper electrode 49, and the main portion 46*a* of the lower electrode 46, the centers thereof coincide with the center of the cavity 43. Further, the center of the circular cavity 43 for deciding the vibratable part of the vibration plate 42 is positioned at the center of the overall liquid-detecting device 60.

The vibratable part of the vibration plate 42 specified by the cavity 43, the part of the main portion 46*a* of the lower electrode 46 corresponding to the cavity 43, the main portion 47*a* and the projection 47*b* of the piezoelectric layer 47, and the main portion 49*a* and the part of the extension part 49*b* of the upper electrode 49 corresponding to the cavity 43 constitute the vibration part 61 of the liquid-detecting device 60. And, the center of the vibration part 61 of the liquid-detecting device 60 coincides with the center of the liquid-detecting device 60.

Furthermore, the main portion 47*a* of the piezoelectric layer 47, the main portion 49*a* of the upper electrode 49, the main portion 46*a* of the lower electrode 46, and the vibratable part (that is, the part corresponding to the bottom 43*a* of the cavity 43) of the vibration plate 42 are circular, and moreover, the overall piezoelectric layer 47, that is, the main portion 47*a* and the extension part 47*b* of the piezoelectric layer 47 are arranged within the area corresponding to the cavity 43, so that the vibration part 61 of the liquid-detecting device 60 is almost symmetrical about the center of the liquid-detecting device 60.

As mentioned above, in this embodiment, the almost overall area corresponding to the cavity 43 is covered by the main portion 46*a* of the lower electrode 46, thereby, the difference between the deformation mode at the time of forcible vibration and the deformation mode at the time of free vibration is reduced compared with the conventional art. Further, the vibration part 61 of the liquid-detecting device 60 is symmetrical about the center of the liquid-detecting device 60, so that the rigidity of the vibration part 61 is almost isotropic viewed from the center.

Therefore, generation of an unnecessary vibration caused by the asymmetrical structure is suppressed and the reduction in the output of the counter electromotive force due to the difference in the deformation mode between the time of forcible vibration and the time of free vibration is prevented. By doing this, the detection accuracy of the resonance frequency of the residual vibration of the vibration part 61 of the liquid-detecting device 60 is improved and the residual vibration of the vibration part 61 can be detected easily.

Further, since the almost overall area corresponding to the cavity 43 is covered by the main portion 46*a* of the lower electrode 46 having a diameter larger than that of the cavity 43, the generation of an unnecessary vibration due to the displacement of the lower electrode 46 during manufacture can be prevented and the reduction in the detection accuracy can be prevented.

Further, the overall hard and fragile piezoelectric layer 47 is arranged within the area corresponding to the cavity 43 and the piezoelectric layer 47 does not exist in the position corresponding to the periphery 43*a* of the cavity 43. Therefore, the problem in the conventional liquid-detecting device that the piezoelectric film is cracked in the position corresponding to the periphery of the cavity can be solved.

Further, since the area of contact between the vibration part 61 and a liquid is limited to the area of existence of the cavity 43, it is possible to detect a liquid at a pin point, thus the ink level in the ink cartridge can be detected with high accuracy.

Figure 4:
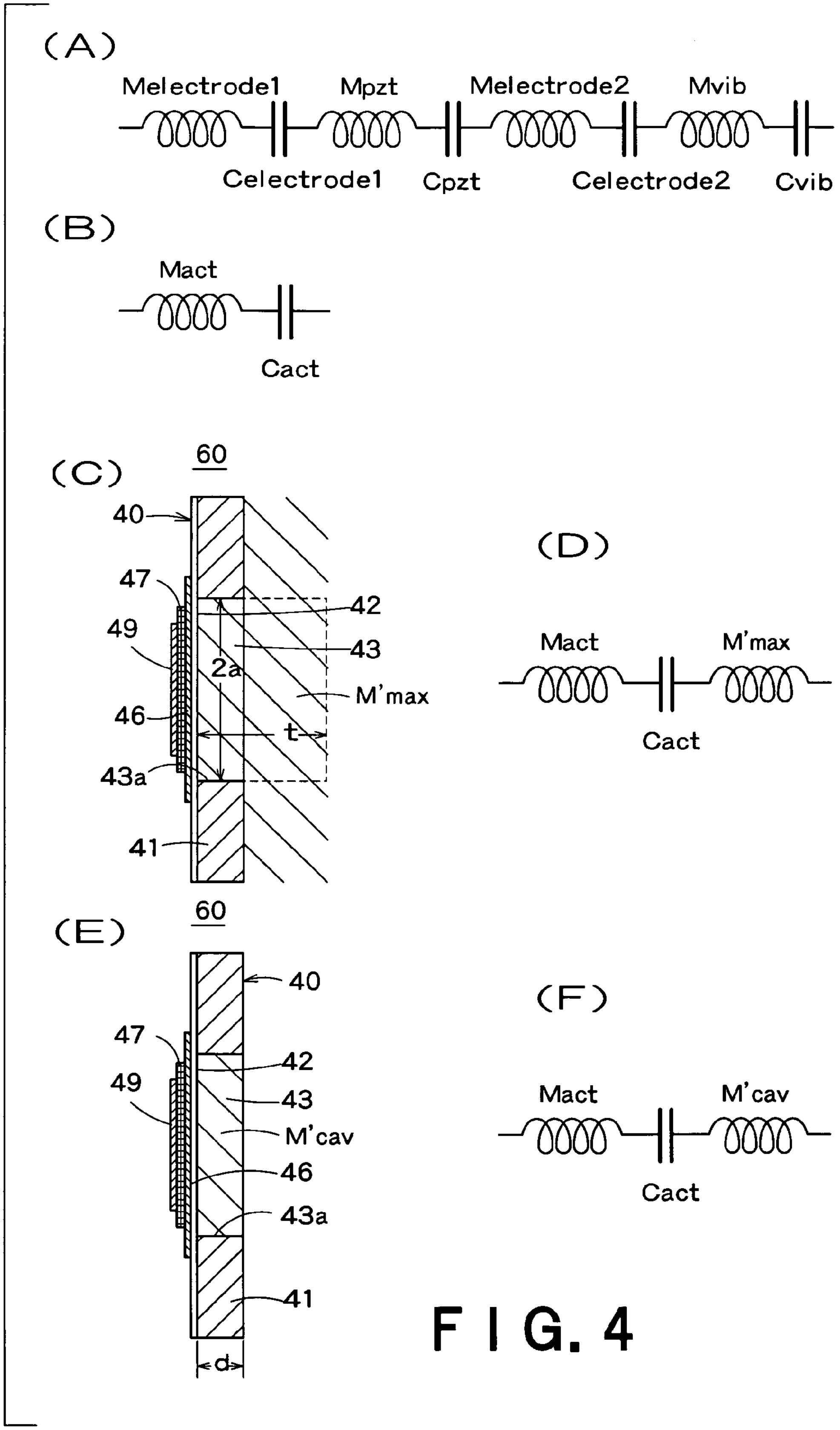
FIG. 4 is a drawing showing the liquid-detecting device shown in FIGS. 2, 3A, and 3B and equivalent circuits thereof.

FIG. 4 shows the liquid-detecting device 60 used in this embodiment and equivalent circuits thereof. The liquid-detecting device 60 detects the resonance frequency by the residual vibration, thereby detects changes in the acoustic impedance and detects the liquid consumption state in the ink cartridge.

FIGS. 4(A) and 4(B) show the equivalent circuits of the liquid-detecting device 60. Further, FIGS. 4(C) and 4(D) respectively show the periphery including the liquid-detecting device 60 and equivalent circuits thereof when the ink cartridge 7 is filled with ink and FIGS. 4(E) and 4(F) respectively show the periphery including the liquid-detecting device 60 and equivalent circuits thereof when there is no ink in the ink cartridge 7.

The liquid-detecting device 60 shown in FIGS. 2 to 4 is mounted at a predetermined position of the container body of the ink cartridge 7 so that the cavity 43 makes contact with a liquid (ink) stored in the container body. Namely, at least a part of the vibration part 61 of the liquid-detecting device 60 is exposed in the storage space of the container body. When a liquid is sufficiently stored in the container body, the inside and outside of the cavity 43 is filled with a liquid.

On the other hand, when the liquid (ink) in the container body of the ink cartridge 7 is consumed and the liquid level falls below the mounting position (strictly speaking, the position of the cavity 43) of the liquid-detecting device 60, a state that there is no liquid in the cavity 43 or a state that a liquid remains only in the cavity 43 and gas exists outside it appears.

The liquid-detecting device 60 detects differences in the acoustic impedance due to changes in the state. By doing this, the liquid-detecting device 60 can detect whether a liquid is sufficiently stored in the container body or a liquid of more than a predetermined amount is consumed.

Next, the principle of liquid level detection by the liquid-detecting device 60 of this embodiment will be explained.

The liquid-detecting device 60 can detect changes in the acoustic impedance of a liquid using changes in the resonance frequency. The resonance frequency can be detected by measuring counter electromotive force generated by the residual vibration remaining in the vibration part 61 after the vibration part 61 of the liquid-detecting device 60 vibrates. Namely, when a driving pulse is applied to the piezoelectric layer 47 of the liquid-detecting device 60, and the vibration part 61 is forcibly vibrated, and then the vibration part 61 vibrates freely, the piezoelectric layer 47 generates counter electromotive force by the residual vibration (free vibration) of the vibration part 61 of the liquid-detecting device 60. The magnitude of the counter electromotive force is changed depending on the amplitude of the vibration part 61 of the liquid-detecting device 60. Therefore, as the amplitude of the residual vibration (free vibration) of the vibration part 61 of the liquid-detecting device 60 increases, the output of the counter electromotive force can be detected easily.

Further, by the frequency of the residual vibration of the vibration part 61 of the liquid-detecting device 60, the cycle of changing the magnitude of the counter electromotive force is changed. Namely, the frequency of the vibration part 61 of the liquid-detecting device 60 corresponds to the frequency of the counter electromotive force. Here, the resonance frequency is referred to as the frequency when the vibration part 61 of the liquid-detecting device 60 and a medium in contact with the vibration part 61 are in a resonance state.

When a liquid (ink) is sufficiently stored in the container body of the ink cartridge 7, the cavity 43 of the liquid-detecting device 60 is filled with a liquid and the vibration part 61 is in contact with a liquid in the container body at the bottom 43*a* of the cavity 43. On the other hand, when a liquid is not stored sufficiently in the container body, the vibration part 61 of the liquid-detecting device 60 makes contact with the residual liquid in the cavity 43 or makes contact with gas or a vacuum instead of a liquid.

Next, by referring to FIGS. 2 to 4, from the resonance frequency between a medium and the vibration part 61 of the liquid-detecting device 60 which is obtained by measurement of the counter electromotive force, the operation and principle of detecting the state of a liquid in the container body of the ink cartridge 7 will be explained.

In the liquid-detecting device 60, via the upper electrode terminal 45 and the lower electrode terminal 44, a voltage is applied to the upper electrode 49 and the lower electrode 46. Then, at the part of the piezoelectric layer 47 which is held by the upper electrode 49 and the lower electrode 46, an electric field is generated. By this electric field, the piezoelectric layer 47 is deformed. When the piezoelectric layer 47 is deformed, the vibration area (the area corresponding to the bottom 43*a* of the cavity 43) of the vibration plate 42 makes a flexible vibration. After forcible deformation of the piezoelectric layer 47, for a little while, the flexible vibration remains in the vibration part 61 of the liquid-detecting device 60.

This residual vibration is a free vibration of the vibration part 61 of the liquid-detecting device 60 and the medium. Therefore, when the voltage applied to the piezoelectric layer 47 is set to a pulse waveform or a square wave, the resonance state between the vibration part 61 and the medium after application of the voltage can be obtained easily. The residual vibration is a vibration of the vibration part 61 of the liquid-detecting device 60 and it is accompanied by deformation of the piezoelectric layer 47. Therefore, in correspondence to the residual vibration, the piezoelectric layer 47 generates counter electromotive force. The counter electromotive force is detected via the upper electrode 49, the lower electrode 46, the upper electrode terminal 45, and the lower electrode terminal 44. By the detected counter electromotive force, the resonance frequency can be identified, so that on the basis of the resonance frequency, the existence of a liquid (ink) in the container body of the ink cartridge 7 can be detected.

Generally, the resonance frequency fs is expressed by:

$$fs=1/(2\pi*(M*Cact)^{1/2}) \quad \text{(Formula 1)}$$

where M indicates the sum of inertance Mact of the vibration part 61 and additional inertance M' and Cact indicates compliance of the vibration part 61.

FIGS. 4(A) and 4(B) show the equivalent circuits of the vibration part 61 of the liquid-detecting device 60 and the cavity 43 when no ink remains in the cavity 43.

Mact indicates the quotient obtained by dividing the product of the thickness of the vibration part 61 and the density of the vibration part 61 by the area of the vibration part 61 and it is expressed by the following in detail as shown in FIG. 4(A):

$$Mact=Mpzt+Melectrode1+Melectrode2+Mvib \quad \text{(Formula 2)}$$

Where Mpzt indicates the quotient obtained by dividing the product of the thickness of the piezoelectric layer 47 of the vibration part 61 and the density of the piezoelectric layer 47 by the area of the piezoelectric layer 47, and Melectrode 1 indicates the quotient obtained by dividing the product of the thickness of the upper electrode 49 of the vibration part 61 and the density of the upper electrode 49 by the area of the upper electrode 49, and Melectrode 2 indicates the quotient obtained by dividing the product of the thickness of the lower electrode 46 of the vibration part 61 and the density of the lower electrode 46 by the area of the lower electrode 46, and Mvib indicates the quotient obtained by dividing the product of the thickness of the vibration plate 42 of the vibration part 61 and the density of the vibration plate 42 by the area of the vibration area of the vibration plate 42.

However, to calculate Mact from the thickness, density, and area of the overall vibration part 61, although the areas of the piezoelectric layer 47, the upper electrode 49, the lower electrode 46, and the vibration area of the vibration plate 42 have the magnitude relations as described above, differences between mutual areas are preferably minute.

Further, in this embodiment, in the piezoelectric layer 47, the upper electrode 49, and the lower electrode 46, the parts other than the circular main portions 47*a*, 49*a*, and 46*a* which are essential sections thereof are preferably as minute as negligible for the main portions. Therefore, in the liquid-detecting device 60, Mact indicates the sum of inertance of the upper electrode 49, the lower electrode 46, the piezoelectric layer 47, and the vibration area of the vibration plate 42. Further, the compliance Cact indicates the compliance of the part formed by the upper electrode 49, the lower electrode 46, the piezoelectric layer 47, and the vibration area of the vibration plate 42.

Further, FIGS. 4(A), (B), (D), and (F) show the equivalent circuits of the vibration part 61 of the liquid-detecting device 60 and the cavity 43 and in the equivalent circuits, and Cact indicates the compliance of the vibration part 61 of the liquid-detecting device 60. Cpzt, Celectrode 1, Celectrode 2, and Cvib respectively indicate the compliances of the piezoelectric layer 47 of the vibration part 61, the upper electrode 49, the lower electrode 46, and the vibration plate 42. Cact is expressed by the following formula 3:

$$1/Cact=(1/Cpzt)+(1/Celectrode1)+(1/Celectrode2)+(1/Cvib) \quad \text{(Formula 3)}$$

From the formulas 2 and 3, FIG. 4(A) can be shown as FIG. 4(B)

The compliance Cact indicates the volume of a medium received by deformation when pressure is applied to a unit area. Namely, the compliance Cact indicates deformability.

FIG. 4(C) shows a sectional view of the liquid-detecting device 60 when a liquid is sufficiently stored in the container body of the ink cartridge 7 and the periphery of the vibration part 61 of the liquid-detecting device 60 is filled with a liquid. M' max shown in FIG. 4(C) indicates the maximum value of the additional inertance (the additional weight (the weight affecting the vibration of the vibration area) is divided by the square of the area) when a liquid is sufficiently stored in the container body of the ink cartridge 7 and the periphery of the vibration part 61 of the liquid-detecting device 60 is filled with a liquid. M' max is expressed by:

$$M'max=(\pi*\rho/(2*k^3))*(2*(2*k*a)^3/(3*\pi))/(\pi*a^2)^2 \quad \text{(Formula 4)}$$

where a indicates the radius of the vibration part, and ρ indicates the density of the medium, and k indicates the wave number.

Further, Formula 4 is held when the vibration part 61 of the liquid-detecting device 60 is a circle with a diameter of a. The addition inertance M' indicates an amount indicating that by a medium in the neighborhood of the vibration part 61, the weight of the vibration part 61 is increased apparently. As shown in Formula 4, M' max is greatly changed by the radius a of the vibration part 61 and the density ρ of the medium. The wave number k is expressed by:

$$k=2*\pi*fact/c \quad \text{(Formula 5)}$$

where fact indicates the resonance frequency of the vibration part 61 and c indicates the acoustic speed propagated in the medium.

FIG. 4(D) shows an equivalent circuit of the vibration part 61 of the liquid-detecting device 60 and the cavity 43 shown in FIG. 4(C) when a liquid is sufficiently stored in the container body of the ink cartridge 7 and the periphery of the vibration part 61 of the liquid-detecting device 60 is filled with a liquid.

FIG. 4(E) shows a sectional view of the liquid-detecting device 60 when the liquid in the container body of the ink cartridge 7 is consumed, and although there is no liquid around the vibration part 61 of the liquid-detecting device 60, a liquid remains in the cavity 43 of the liquid-detecting device 60.

Formula 4 is a formula indicating the maximum inertance M' max decided from the density ρ of ink when the container body of the ink cartridge 7 is filled with a liquid. On the other hand, the additional inertance M' when the liquid in the container body is consumed and while a liquid remains in the cavity 43, the liquid around the vibration part 61 of the liquid-detecting device 60 is replaced with gas or a vacuum is generally expressed by (more in detail, refer to Formula 8 described later):

$$M'=\rho*t/S \quad \text{(Formula 6)}$$

where t indicates the thickness of the medium concerning the vibration and S indicates the area of the vibration part 61 of the liquid-detecting device 60, which is $\pi*a^2$ when the vibration part 61 is a circle with a radius of a).

Therefore, the additional inertance M' follows Formula 4 when a liquid is sufficiently stored in the container body and the periphery of the vibration part 61 of the liquid-detecting device 60 is filled with a liquid. On the other hand, when the liquid is consumed and while a liquid remains in the cavity 43, the liquid around the vibration part 61 of the liquid-detecting device 60 is replaced with gas or a vacuum, it follows Formula 6.

Here, as shown in FIG. 4(E), the additional inertance M' when the liquid in the container body of the ink cartridge 7 is consumed, and there is no liquid around the vibration part 61 of the liquid-detecting device 60, though a liquid remains in the cavity 43 of the liquid-detecting device 60 is assumed as M' cav for convenience to distinguish it from the additional inertance M' max when the periphery of the vibration part 61 of the liquid-detecting device 60 is filled with a liquid.

FIG. 4(F) shows an equivalent circuit of the vibration part 61 of the liquid-detecting device 60 and the cavity 43 shown in FIG. 4(E) when the liquid in the container body of the ink cartridge 7 is consumed, and although there is no liquid around the vibration part 61 of the liquid-detecting device 60, a liquid remains in the cavity 43 of the liquid-detecting device 60.

Here, the parameters concerning the medium state, in Formula 6, are the medium density ρ and the medium thickness t. When a liquid is sufficiently stored in the container body, the liquid is in contact with the vibration part 61 of the liquid-detecting device 60. On the other hand, when a liquid is not stored sufficiently in the container body, a liquid remains in the cavity 43 or gas or a vacuum is in contact with the vibration part 61 of the liquid-detecting device 60. The additional inertance M' var in the course that the liquid around the liquid-detecting device 60 is consumed and M' max shown in FIG. 4(C) moves to M' cav shown in FIG. 4(E) is changed depending on the storage state of a liquid in the container body in correspondence to changes in the medium density ρ and the medium thickness t. By doing this, the resonance frequency fs is also changed. Therefore, when the resonance frequency fs is identified, the liquid amount in the container body can be detected.

Here, as shown in FIG. 4(E), assuming as t=d, by substituting the depth d of the cavity for t in Formula 6, M' cav is expressed by:

$$M'cav=\rho*d/S \quad \text{(Formula 7)}$$

Further, when the medium is a different kind of liquid, the density ρ is different depending on the difference in the composition, so that the additional inertance M' and the resonance frequency fs are different. Therefore, when the resonance frequency fs is identified, the liquid kind can be detected.

Figure 5A:
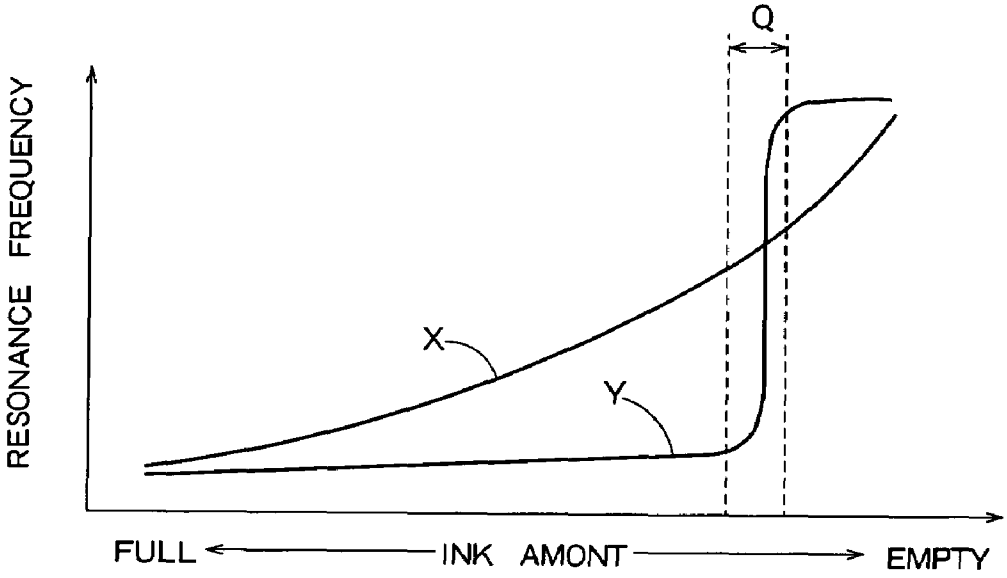
FIG. 5A is a drawing showing the relationship between the resonance frequency of the vibration part detected by the liquid-detecting device shown in FIGS. 2, 3A, and 3B and the residual ink amount in the ink cartridge.

FIG. 5A is a graph showing the relationship between the ink amount in the container body of the ink cartridge 7, the ink, and the resonance frequency fs of the vibration part. The ordinate axis indicates the resonance frequency fs and the abscissa axis indicates the ink amount.

When ink is sufficiently stored in the container body of the ink cartridge 7 and the periphery of the vibration part 61 of the liquid-detecting device 60 is filled with ink, the maximum additional inertance M' max is the value indicated by Formula 4. On the other hand, when the ink is consumed and while ink remains in the cavity 43, the periphery of the vibration part 61 of the liquid-detecting device 60 is not filled with ink, the additional inertance M' var is calculated from Formula 6 on the basis of the medium thickness t. t in Formula 6 is the medium thickness concerning the vibration, so that when the depth d of the cavity 43 of the liquid-detecting device 60 in which ink remains is made smaller, that is, the substrate 41 is made thin sufficiently, the course that ink is slowly consumed can be detected (refer to FIG. 4(C)). Here, t-ink indicates the thickness of ink concerning the vibration and t ink-max indicates t ink of M' max.

For example, the liquid-detecting device 60 is arranged on the bottom of the ink cartridge almost horizontally with the ink level. In this case, when the ink is consumed and the ink level drops below the height t-ink-max from the liquid-detecting device 60, by Formula 6, M' var is slowly changed and by Formula 1, the resonance frequency fs is slowly changed. Therefore, as long as the ink level is within the range t, the liquid-detecting device 60 can slowly detect the ink consumption state.

Or, the liquid-detecting device 60 is arranged on the side wall of the ink cartridge almost perpendicularly to the ink level. In this case, when the ink is consumed and the ink level reaches the vibration part 61 of the liquid-detecting device 60, in correspondence to the fall of the liquid level, the additional inertance M' is reduced. Accordingly, by Formula 1, the resonance frequency fs slowly increases. Therefore, as long as the ink level is within the range of the diameter 2*a* (refer to FIG. 4(C)) of the cavity 43, the liquid-detecting device 60 can slowly detect the ink consumption state.

The curve X shown in FIG. 5A indicates the relationship between the ink amount stored in the container body, the ink, and the resonance frequency fs of the vibration part 61 when the cavity 43 of the liquid-detecting device 60 arranged on the bottom is made sufficiently shallow or the vibration part 61 of the liquid-detecting device 60 arranged on the side wall is made sufficiently large or long. The situation that the ink amount in the container body is slowly reduced and the ink and resonance frequency fs of the vibration part 61 are slowly changed can be understood.

More in detail, the case that the course that ink is slowly consumed can be detected is a case that in the periphery of the vibration part 61 of the liquid-detecting device 60, a liquid and gas which are different in the density coexist and are concerned with the vibration. As ink is slowly consumed, in the periphery of the vibration part 61 of the liquid-detecting device 60, among the media concerning the vibration, the liquid is reduced, while gas is increased.

For example, when the liquid-detecting device 60 is arranged horizontally with the ink level and t ink is smaller than t ink-max, the media concerning the vibration of the liquid-detecting device 60 include both ink and gas. Therefore, using the area S of the vibration part 61 of the liquid-detecting device 60, when expressing the state below M' max of Formula 4 by the additional weight of ink and gas, the following is obtained:

$$M'=M'air+M'ink=\rho air*tair/S+\rho ink*tink/S \quad \text{(Formula 8)}$$

where M' air indicates inertance of air, M' ink inertance of ink, ρair the density of ink, ρ ink the density of ink, t air the thickness of air concerning the vibration, and t ink the thickness of ink concerning the vibration.

Among the media concerning the vibration in the periphery of the vibration part 61 of the liquid-detecting device 60, as the liquid is reduced and gas is increased, when the liquid-detecting device 60 is arranged almost horizontally with the ink level, t air is increased and t ink is reduced. Accordingly, M' var is slowly reduced and the resonance frequency is slowly increased. Therefore, the ink amount remaining in the container body or the ink consumption amount can be detected. Further, the reason that Formula 7 is a formula of only the density of a liquid is that a case that the air density is as low as it can be ignored for the liquid density is supposed.

When the liquid-detecting device 60 is arranged almost perpendicularly to the ink level, in the vibration part 61 of the liquid-detecting device 60, a parallel equivalent circuit (not shown in the drawing) of the region where the medium concerning the vibration of the liquid-detecting device 60 is only ink and the region where the medium concerning the vibration of the liquid-detecting device 60 is only gas may be considered. Assuming the area of the region where the medium concerning the vibration of the liquid-detecting device 60 is only ink as S ink and the area of the region where the medium concerning the vibration of the liquid-detecting device 60 is only gas as S air, the following formula is obtained:

$$1/M'=1/M'air+1/M'ink=Sair/(\rho air*tair)+Sink/(\rho ink*tink) \quad \text{(Formula 9)}$$

Further, Formula 9 is applied to a case that no ink is preserved in the cavity 43 of the liquid-detecting device 60. The additional inertance when ink is preserved in the cavity 43 of the liquid-detecting device 60 can be calculated by the sum of M' of Formula 9 and M' cav of Formula 7.

The vibration of the vibration part 61 of the liquid-detecting device 60 is changed from the depth t ink-max to the depth d of remaining ink, so that when the liquid-detecting device 60 is arranged on the bottom under condition that the ink remaining depth is slightly smaller than t ink-max, the course that ink is slowly reduced cannot be detected. In this case, from the vibration change of the liquid-detecting device for a slight ink amount change from t ink-max to the remaining depth d, changing of the ink amount is detected. Further, when the liquid-detecting device 60 is arranged on the side and the diameter of the cavity 43 is small, the vibration change of the liquid-detecting device 60 during passing the cavity 43 is minute, so that it is difficult to detect the ink amount in the passing course and whether the ink level is higher or lower than the cavity 43 is detected.

For example, the curve Y shown in FIG. 5A indicates the relationship between the ink amount in the container body, the ink, and the resonance frequency fs of the vibration part 61 when the vibration part 61 forms a small circular vibration area. Between the differences Q in the ink amount before and after the ink level in the container body passes the mounting position of the liquid-detecting device 60, the situation that the resonance frequency fs between the ink and the vibration part 61 is changed violently is shown. From this, whether a predetermined amount of ink remains in the container body or not can be detected on a binary basis, so that highly accurate detection can be performed.

The method for detecting the existence of a liquid using the liquid-detecting device 60 like this detects the existence of ink by direct contact of the vibration part 61 with ink, so that compared with a method for calculating the ink consumption amount by software, the detection accuracy is high. Furthermore, a method for detecting the existence of ink by the conductivity using an electrode is affected by the mounting position of the electrode on the container body and the ink kind, though the method for detecting the existence of a liquid using the liquid-detecting device 60 is hardly affected by the mounting position of the liquid-detecting device 60 on the container body and the ink kind.

Furthermore, both oscillation and liquid detection can be executed using a single liquid-detecting device 60, so that compared with a method for executing oscillation and liquid detection using different sensors, the number of sensors mounted on the container body can be reduced. Therefore, the ink cartridge 7 having the liquid amount detection function can be manufactured at low cost. Further, the oscillation frequency of the piezoelectric layer 47 is set within the non-audible range, thus the sound generated during operation of the liquid-detecting device 60 is preferably made quiet.

Figure 5B:
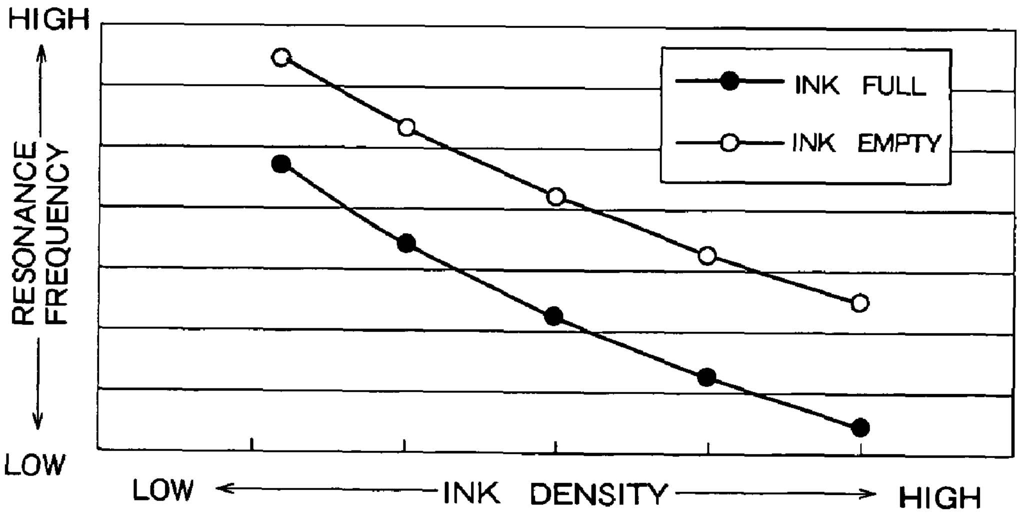
FIG. 5B is a drawing showing the relationship between the resonance frequency of ink detected by the liquid-detecting device shown in FIGS. 2, 3A, and 3B and the ink density.

FIG. 5B shows an example of the relationship between the ink density, the ink, and the resonance frequency fs of the vibration part 61. Here, "Ink full" and "Ink empty" (or "No ink") mean two relative states and do not mean the so-called ink full state and ink end state. As shown in FIG. 5B, when the ink density is high, the additional inertance is increased, so that the resonance frequency fs is reduced. Namely, the resonance frequency fs depends on the ink kind. Therefore, by measuring the resonance frequency fs, when re-charging ink, mixture of ink of different density can be confirmed. Namely, an ink cartridge 7 for storing a different kind of ink can be discriminated.

Next, when the size and shape of the cavity 43 are set so that a liquid remains in the cavity 43 of the liquid-detecting device 60 even if the container body of the ink cartridge 7 contains no ink, conditions for accurately detecting the liquid state will be described in detail. The liquid-detecting device 60, if it can detect the liquid state when the cavity 43 is filled with a liquid, even if the cavity 43 is not filled with a liquid, can detect the liquid state.

The resonance frequency fs is a function of the inertance M. The inertance M is the sum of the inertance Mact of the vibration part 61 and the additional inertance M'. Here, the additional inertance M' is related to the liquid state. The additional inertance M' is an amount indicating that the weight of the vibration part 61 is increased apparently by a medium in the neighborhood of the vibration part 61. Namely, it is an increased amount of the weight of the vibration part 61 due to apparently absorbing the medium (the inertance concerning the vibration is increased) by the vibration of the vibration part 61.

Therefore, when M' cav is larger than M' max of Formula 4, the medium apparently absorbed is all a liquid remaining in the cavity 43. Therefore, it is the same state as that when the container body is filled with a liquid. In this case, the medium concerning the vibration will not be smaller than M' max, so that even if ink is consumed, no changes can be detected.

On the other hand, when M' cav is smaller than M' max of Formula 4, the medium apparently absorbed is a liquid remaining in the cavity 43 and gas in the container body or a vacuum. At this time, unlike the state that the container body is filled with a liquid, M' is changed, so that the resonance frequency fs is changed. Therefore, the liquid-detecting device 60 can detect the liquid state in the container body.

Namely, when the container body of the ink cartridge 7 contains no liquid and a liquid remains in the cavity 43 of the liquid-detecting device 60, the condition under which the liquid-detecting device 60 can detect accurately the liquid state is that M' cav is smaller than M' max. Further, the condition M' max>M' cav under which the liquid-detecting device 60 can detect accurately the liquid state does not depend on the shape of the cavity 43.

Here, M' cav is weight inertance of a liquid in the almost same volume as that of the cavity 43. Therefore, from the inequality M' max>M' cav, the condition under which the liquid-detecting device 60 can detect accurately the liquid state can be expressed as a condition of the volume of the cavity 43. For example, assuming the radius of the circular cavity 43 as a and the depth of the cavity 43 as d, the following condition is obtained:

$$M'\max > \rho * d/\pi a^2 \qquad \text{(Formula 10)}$$

When Formula 10 is developed, the following condition is obtained:

$$a/d > 3*\pi/8 \qquad \text{(Formula 11)}$$

Therefore, when the liquid-detecting device 60 has a cavity 43 in which the radius of an opening 161 satisfying Formula 11 is a and the depth of the cavity 43 is d, even if the container body contains no liquid and a liquid remains in the cavity 43, the liquid-detecting device 60 can detect the liquid state free of malfunctions.

Further, Formulas 10 and 11 are held only when the cavity 43 is circular. When the cavity 43 is not circular, by calculation by replacing $\pi a^2$ of Formula 10 with the area thereof using the corresponding formula of M' max, the relationship between the dimensions of the cavity 43 such as the width and length and the depth thereof can be derived.

Further, the additional inertance M' affects the acoustic impedance characteristics, so that it may be said that the method for measuring counter electromotive force generated in the liquid-detecting device 60 by the residual vibration detects at least changes in the acoustic impedance characteristics.

Figure 6A:
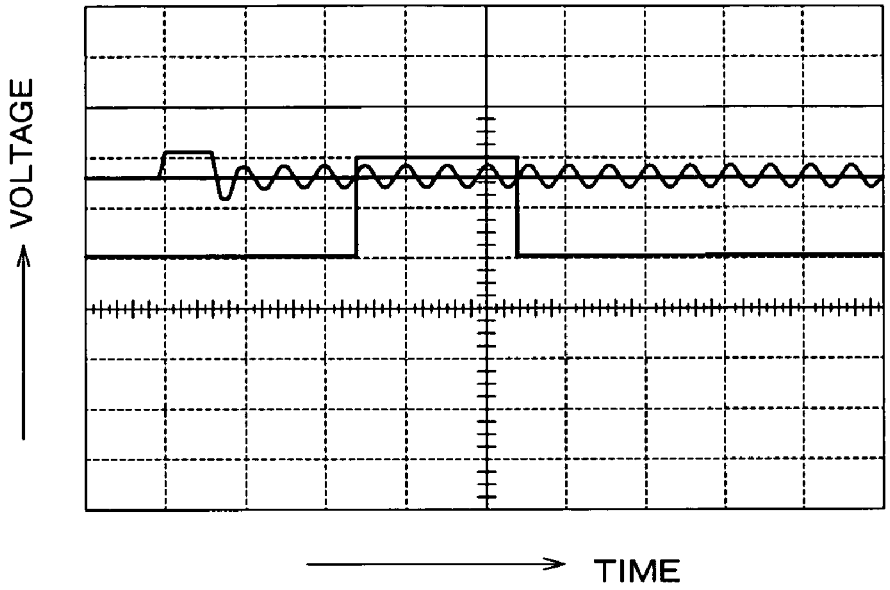
FIGS. 6A and 6B are drawings showing counter electromotive force waveforms in the liquid-detecting device shown in FIGS. 2, 3A, and 3B.
Figure 6B:
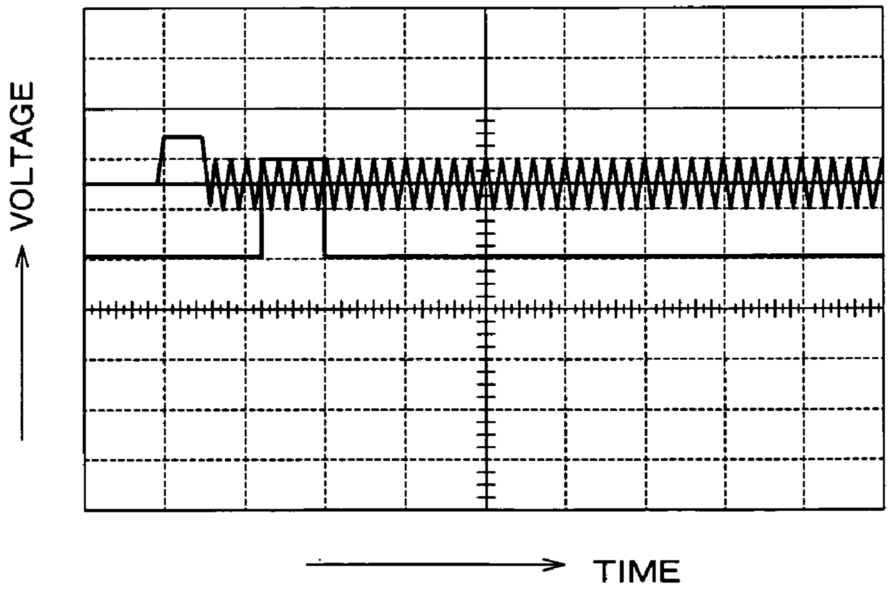

FIGS. 6A and 6B show a measuring method of the waveform of the residual vibration (free vibration) of the liquid-detecting device 60 and of the residual vibration after a driving signal is supplied to the liquid-detecting device 60 and the vibration part 61 is forcibly vibrated. Displacement of the liquid level up and down from the mounting position level of the liquid-detecting device 60 in the ink cartridge 7 can be detected by frequency changes and amplitude changes of the residual vibration after oscillation of the piezoelectric element of the liquid-detecting device 60. In FIGS. 6A and 6B, the ordinate axis indicates the voltage of the counter electromotive force generated by the residual vibration of the liquid-detecting device 60 and the abscissa axis indicates the time. By the residual vibration of the liquid-detecting device 60, as shown in FIGS. 6A and 6B, the waveform of an analog signal of the voltage is generated. Next, the analog signal is converted (binarized) to a digital numerical value corresponding to the frequency of the signal. In the examples shown in FIGS. 6A and 6B, the time required to generate four pulses from the fourth pulse of the analog signal to the eighth pulse is measured.

More in detail, after oscillation of the liquid-detecting device 60, the number of times crossing a predetermined reference voltage from the low voltage side to the high voltage side is counted. And, a digital signal which is high between the count 4 and the count 8 is generated and the time from the count 4 to the count 8 is measured by a predetermined clock pulse.

FIG. 6A shows the waveform when the liquid level is higher than the mounting position level of the liquid-detecting device 60. On the other hand, FIG. 6B shows the waveform when the liquid level is lower than the mounting position level of the liquid-detecting device 60. By comparison of FIG. 6A with FIG. 6B, it is found that the time from the count 4 to the count 8 shown in FIG. 6A is longer than that shown in FIG. 6B. In other words, depending on the existence of ink on the mounting position level of the liquid-detecting device 60, the required time from the count 4 to the count 8 is different. Using the difference in the required time, the ink consumption state can be detected.

The reason that the number of pulses is counted starting from the count 4 of the analog waveform is that the measurement is started after the residual vibration (free vibration) of the liquid-detecting device 60 is stabilized. The count 4 is just an example and the measurement may be started from any count. Here, a signal from the count 4 to the count 8 is detected and the time from the count 4 to the count 8 is measured by a predetermined clock pulse. On the basis of this time, the resonance frequency can be obtained. The clock pulse does not need to measure the time up to the count 8 and may measure up to an optional count. In FIGS. 6A and 6B, the time from the count 4 to the count 8 is measured, though according to the circuit configuration for detecting the frequency, the time at a different count interval may be detected.

For example, when the ink quality is stable and the peak amplitude is changed little, to speed up the detection, the time from the count 4 to the count 6 is detected, thus the resonance frequency may be obtained. Further, when the ink quality is unstable and the peak amplitude is changed greatly, to accurately detect the residual vibration, the time from the count 4 to the count 12 may be detected.

Figure 7:
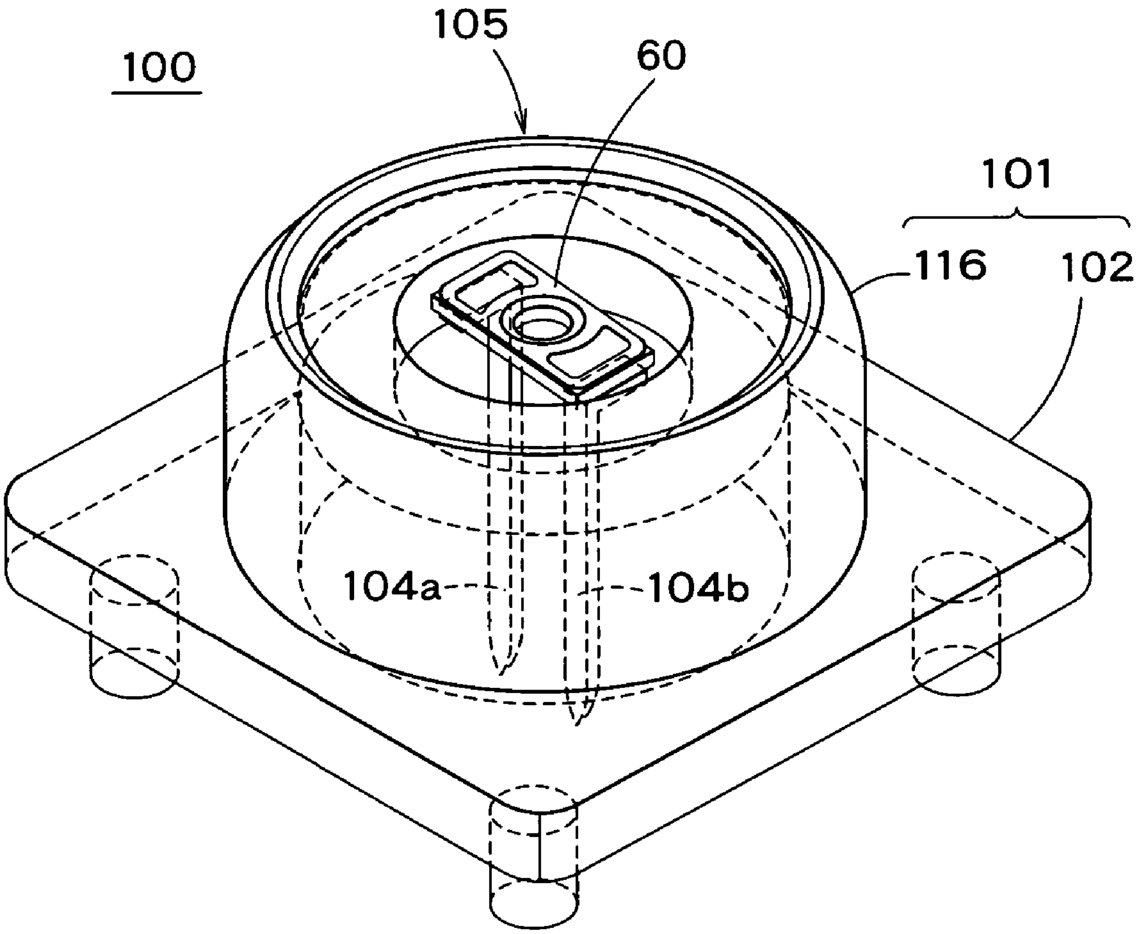
FIG. 7 is a perspective view showing a module body incorporating the liquid-detecting device shown in FIGS. 2, 3A, and 3B.

FIG. 7 is a perspective view showing the constitution that the liquid-detecting device 60 is integrally formed as a mounting module body 100. The module body 100 is mounted at a predetermined position of the container body of the ink cartridge 7. The module body 100 is structured so as to detect at least changes in the acoustic impedance of the medium in the container body, thereby to detect the ink consumption state in the container body.

The module body 100 in this embodiment has a container mounting unit 101 for mounting the liquid-detecting device 60 on the container body. The container mounting unit 101 has a base 102 having an almost rectangular surface and a cylinder 116 on the base 102 for storing the liquid-detecting device 60 oscillating by a driving signal. Further, the module body 100 is structured, when it is mounted on the ink cartridge 7, so that the liquid-detecting device 60 of the module body 100 is free of contact from the outside. By doing this, the liquid-detecting device 60 can be protected from contact with the outside. Further, the edge of the cylinder 116 on the end side is rounded, so that when mounting it into the hole formed in the ink cartridge 7, it can be fit easily.

Figure 8:
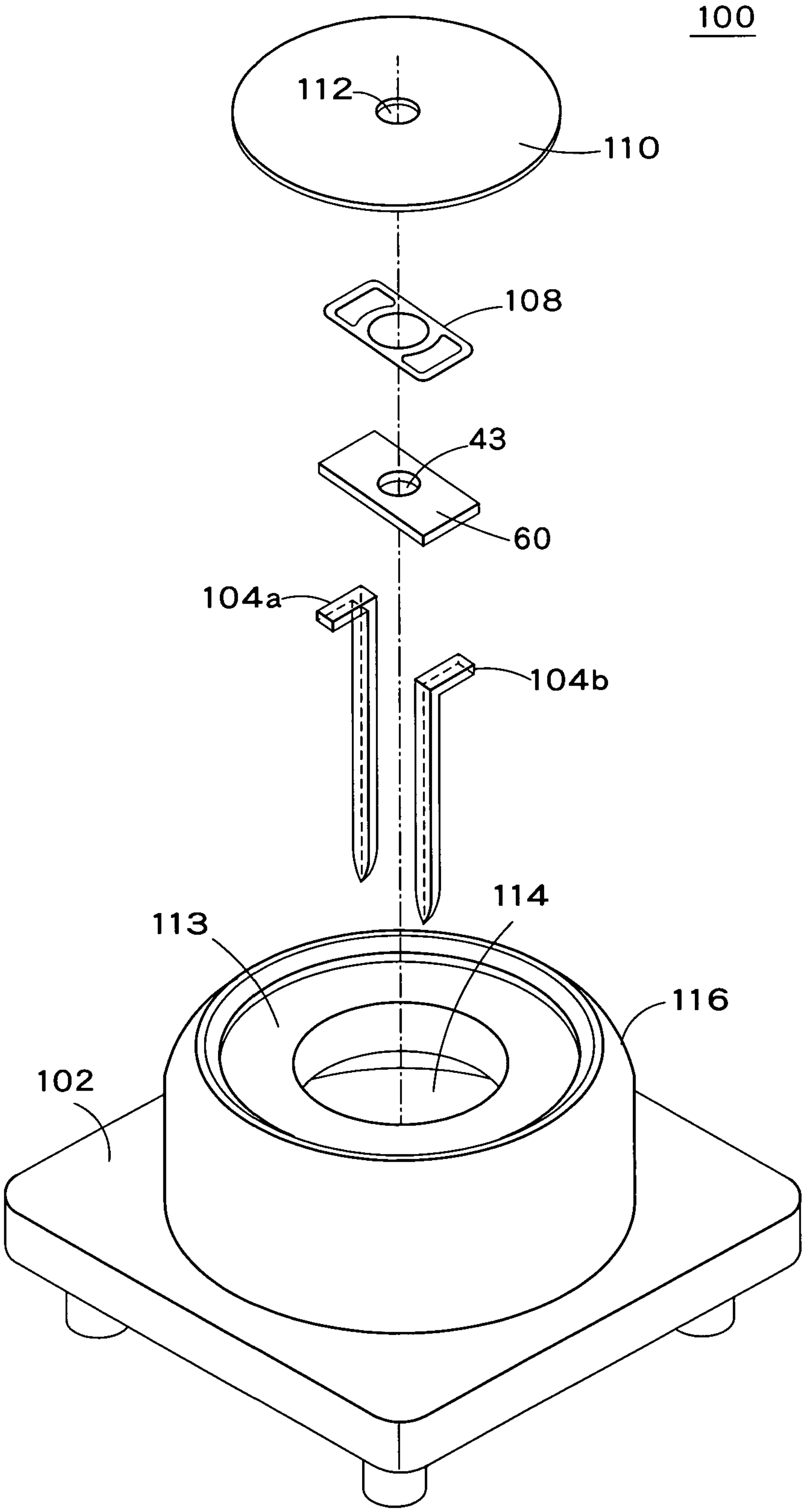
FIG. 8 is an exploded view showing the constitution of the module body shown in FIG. 7.

FIG. 8 is an exploded view of the module body 100 shown in FIG. 7. The module body 100 includes the container mounting unit 101 made of resin and an apparatus mounting unit 105 (refer to FIG. 7) having a plate 110 and a concavity 113. Furthermore, the module body 100 has lead wires 104*a* and 104*b*, the liquid-detecting device 60, and a film 108. The plate 110 is preferably formed from a hardly rust material such as stainless steel or a stainless steel alloy.

In the cylinder 116 and the base 102 included in the container mounting unit 101, to store the lead wires 104*a* and 104*b*, an opening 114 is formed at the center and to store the liquid-detecting device 60, the film 108, and the plate 110, the concavity 113 is formed around the opening 114.

The liquid-detecting device 60 is joined to the plate 110 via the film 108, and the plate 110 and the liquid-detecting device 60 are fixed to the concavity 113 (the container mounting unit 101). Therefore, the lead wires 104*a* and 104*b*, the liquid-detecting device 60, the film 108, and the plate 110 are integrally mounted on the container mounting unit 101.

The lead wires 104*a* and 104*b* are respectively joined to the upper electrode terminal 45 and the lower electrode terminal 44 of the liquid-detecting device 60, transfer a driving signal (driving pulse) to the piezoelectric layer 47, and transfer the signal of the resonance frequency detected by the liquid-detecting device 60 to the recording apparatus.

The liquid-detecting device 60, on the basis of the driving signal transferred from the lead wires 104*a* and 104*b*, oscillates temporarily. Further, the liquid-detecting device 60 executes residual-vibration after oscillation and generates counter electromotive force by the vibration. At this time, by detection of the vibration cycle of the counter electromotive force waveform, the resonance frequency corresponding to the liquid consumption state in the container body can be detected.

The film 108 adheres the liquid-detecting device 60 to the plate 110 to make the liquid-detecting device 60 liquid-tight. The film 108 is preferably formed by polyolefin and adhered by thermal fusion. The liquid-detecting device 60 and the plate 110 are adhered and fixed flatly by the film 108, thus variations due to the adhesion position are eliminated, and the parts other than the vibration part do not vibrate. Therefore, even if the liquid-detecting device 60 is adhered to the plate 110, the vibration characteristics of the liquid-detecting device 60 are not changed.

Further, the plate 110 is circular and the opening 114 of the base 102 is formed in a cylindrical shape. The liquid-detecting device 60 and the film 108 are formed in a rectangular shape. The lead wires 104*a* and 104*b*, the liquid-detecting device 60, the film 108, and the plate 110 may be removably attached to the base 102. The base 102, the lead wires 104*a* and 104*b*, the liquid-detecting device 60, the film 108, and the plate 110 are arranged symmetrically about the central axis of the module body 100. Further, the centers of the base 102, the liquid-detecting device 60, the film 108, and the plate 110 are arranged almost on the central axis of the module body 100.

Further, the area of the opening 114 of the base 102 is formed larger than the area of the vibration region of the liquid-detecting device 60. At the center of the plate 110 facing the vibration part of the liquid-detecting device 60, a through hole 112 is formed. As shown in FIGS. 2 to 4, in the liquid-detecting device 60, the cavity 43 is formed and the through hole 112 and the cavity 43 form an ink reservoir. The thickness of the plate 110, to decrease the effect of residual ink, is preferably smaller than the diameter of the through hole 112. For example, the depth of the through hole 112 is preferably equal to or smaller than ⅓ of the diameter thereof. The through hole 112 is in an almost circle shape symmetrical about the central axis of the module body 100. Further, the area of the through hole 112 is larger than the area of the opening of the cavity 43 of the liquid-detecting device 60. The periphery of the section of the through hole 112 may be tapered or stepped.

The module body 100, so that the through hole 112 is directed inward the container body, is mounted on the side, top, or bottom of the container body. When ink is consumed and ink around the liquid-detecting device 60 is exhausted, since the resonance frequency of the liquid-detecting device 60 is changed greatly, changes in the ink level can be detected.

Figure 9:
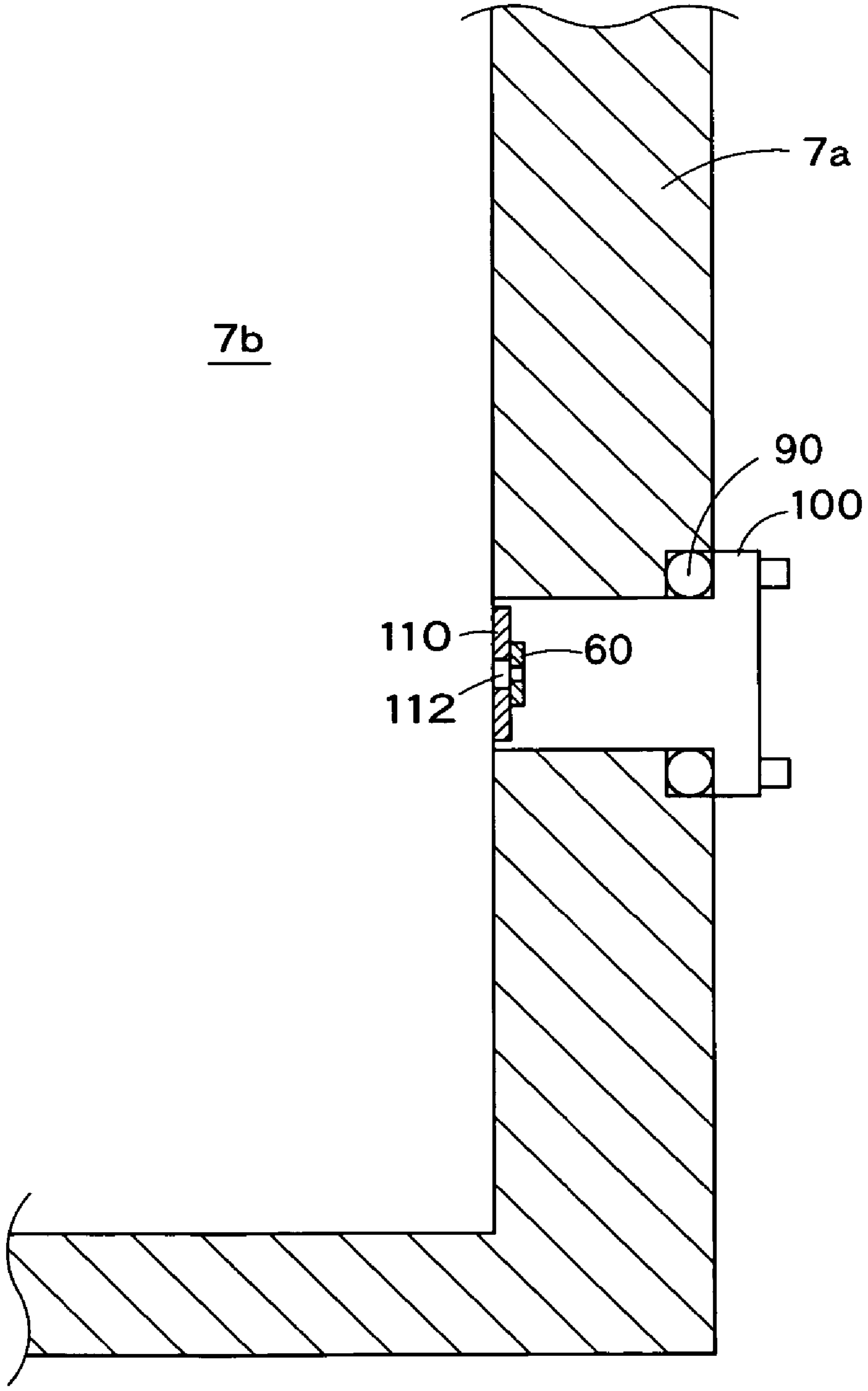
FIG. 9 is a drawing showing a sectional example of the module body shown in FIG. 7 which is mounted in the container body of the ink cartridge.

FIG. 9 is a sectional view of the neighborhood of the bottom of a container body 7*a* when the module body 100 shown in FIG. 7 is mounted on the container body 7*a* of the ink cartridge 7. The module body 100 is mounted in the through hole formed in the side wall of the container body 7*a*. On the joined face between the side wall of the container body 7*a* and the module body 100, an O-ring 90 is installed to keep the module body 100 and the container body 7*a* liquid-tight. The gap can be sealed by the O-ring 90 like this, so that the module body 100, as explained in FIG. 7, preferably has a cylinder.

Since the end of the module body 100 is exposed in an ink storage space 7*b* of the container body 7*a*, via the through hole 112 of the plate 110, ink in the container body 7*a* makes contact with the liquid-detecting device 60. Depending on whether the periphery of the vibration part of the liquid-detecting device 60 is a liquid or gas, the resonance frequency of the residual vibration of the liquid-detecting device 60 is different, so that the ink consumption state can be detected using the module body 100.

Next, a liquid-detecting device according to another embodiment of the present invention and an ink cartridge (liquid container) having the liquid-detecting device will be explained by referring to the drawings.

FIGS. 10, 11A, and 11B are drawings showing a liquid-detecting device 260 of this embodiment, and the liquid-detecting device 260 has a base 240 formed by laminating a vibration plate 242 on a substrate 241, and the base 240 has a first face 240*a* and a second face 240*b* opposite to each other. On the base 240, a circular cavity (concavity) 243 for receiving a medium to be detected is formed so as to be opened on the side of the first face 240*a* and a bottom 243*a* of the cavity 243 is configured to be capable of vibrating by the vibration plate 242. In other words, the part of the overall vibration plate 242 which vibrates actually is defined at the contour thereof by the cavity 243. At both ends of the base 240 on the side of the second face 240*b*, a lower electrode terminal 244 and an upper electrode terminal 245 are formed.

On the second face 240*b* of the base 240, a lower electrode (first electrode) 246 is formed and the lower electrode 246 has a circular main portion 246*a* and an extension part 246*b* which extends from the main portion 246*a* toward the lower electrode terminal 244 and is connected to the lower electrode terminal 244. The center of the circular main portion 246*a* of the lower electrode 246 coincides with the center of the cavity 243.

The circular main portion 246*a* of the lower electrode 246 is formed in a diameter larger than that of the circular cavity 243 and covers overall the area corresponding to the cavity 243.

On the lower electrode 246, a piezoelectric layer 247 is laminated and the piezoelectric layer 247 has a circular main portion 247*a* formed in a diameter smaller than that of the cavity 243 and an extension part 247*b* extending from the main portion 247*a* up to the outside of the area corresponding to the bottom of the cavity 243 beyond the position corresponding to the periphery of the cavity 243.

On the piezoelectric layer 247, a circular main portion 249*a* of an upper electrode (second electrode) 249 is laminated and the main portion 249*a* of the upper electrode 249 is formed in a diameter smaller than that of the main portion 247*a* of the piezoelectric layer 247. Further, the upper electrode 249 has an extension part 249*b* which extends from the main portion 249*a*, extends on the extension part 247*b* of the piezoelectric layer 247, and extends up to the outside of the area corresponding to the bottom of the cavity 243. The extension part 249*b* extends beyond the extension part 247*b* of the piezoelectric layer 247 and is connected to the upper electrode terminal 245.

As mentioned above, the main portion 247*a* of the piezoelectric layer 247 is structured so as to be held by the main portion 249*a* of the upper electrode 249 and the main portion 246*a* of the lower electrode 246. By doing this, the piezoelectric layer 247 can be driven to effectively deform.

As mentioned above, the main portion 249*a* of the upper electrode 249 is formed in a diameter smaller than that of the main portion 247*a* of the piezoelectric layer 247. On the other hand, the main portion 246*a* of the lower electrode 246 covers overall the main portion 247*a* of the piezoelectric layer 247. Therefore, the main portion 249*a* of the upper electrode 249 decides the area of the part of overall the piezoelectric layer 247 where the piezoelectric effect is produced.

Further, the members included in the liquid-detecting device 260 are preferably formed integrally with each other by mutual calcination. When the liquid-detecting device 260 is integrally formed like this, the liquid-detecting device 260 can be handled easily.

As a material of the piezoelectric layer 247, it is preferable to use zirconium acid titanate (PZT), zirconium acid titanate lantern (PLZT), or a lead-less piezoelectric film using no lead. As a material of the substrate 241, it is preferable to use zirconia or alumina. Further, the vibration plate 242 preferably uses the same material as that of the substrate 241. The upper electrode 249, the lower electrode 246, the upper electrode terminal 245, and the lower electrode terminal 244 can be made with a conductive material, for example, metals of gold, silver, copper, platinum, aluminum, and nickel.

With respect to the main portion 247*a* of the piezoelectric layer 247, the main portion 249*a* of the upper electrode 249, and the main portion 246*a* of the lower electrode 246, the centers thereof coincide with the center of the cavity 243. Further, the center of the circular cavity 243 for deciding the vibratable part of the vibration plate 242 is positioned at the center of the overall liquid-detecting device 260.

The vibratable part of the vibration plate 242 specified by the cavity 243, the part of the main portion 246*a* of the lower electrode 246 corresponding to the cavity 243, the main portion 247*a* and the part of the extension part 247*b* of the piezoelectric layer 247 corresponding to the cavity 243, and the main portion 249*a* and the part of the extension part 249*b* of the upper electrode 249 corresponding to the cavity 243 constitute the vibration part 261 of the liquid-detecting device 260. And, the center of the vibration part 261 of the liquid-detecting device 260 coincides with the center of the liquid-detecting device 260.

Furthermore, the main portion 247*a* of the piezoelectric layer 247, the main portion 249*a* of the upper electrode 249, the main portion 246*a* of the lower electrode 246, and the vibratable part (that is, the part corresponding to the bottom 243*a* of the cavity 243) of the vibration plate 242 are circular, so that the vibration part 261 of the liquid-detecting device 260 is almost symmetrical about the center of the liquid-detecting device 260.

As mentioned above, in this embodiment, the overall area corresponding to the cavity 243 is covered by the main portion 246*a* of the lower electrode 246, thereby, the difference between the deformation mode at the time of forcible vibration and the deformation mode at the time of free vibration is reduced compared with the conventional art. Further, the vibration part 261 of the liquid-detecting device 260 is almost symmetrical about the center of the liquid-detecting device 260, thereby, the rigidity of the vibration part 261 is almost isotropic viewed from the center.

Therefore, generation of an unnecessary vibration caused by the asymmetrical structure is suppressed and the reduction in the output of the counter electromotive force due to the difference in the deformation mode between the time of forcible vibration and the time of free vibration is prevented. By doing this, the detection accuracy of the resonance frequency of the residual vibration of the vibration part 261 of the liquid-detecting device 260 is improved and the residual vibration of the vibration part 261 can be detected easily.

Further, the overall area corresponding to the cavity 243 is covered by the main portion 246*a* of the lower electrode 246 having a diameter larger than that of the cavity 243, thereby, the generation of an unnecessary vibration due to the displacement of the lower electrode 246 during manufacture is prevented and the reduction in the detection accuracy can be prevented.

Further, the area of contact between the vibration part 261 of the liquid-detecting device 260 and a liquid is limited to the area of existence of the cavity 243, thereby, it is possible to detect a liquid at a pin point, thus the ink level in the ink cartridge 7 can be detected with high accuracy.

Figure 12:
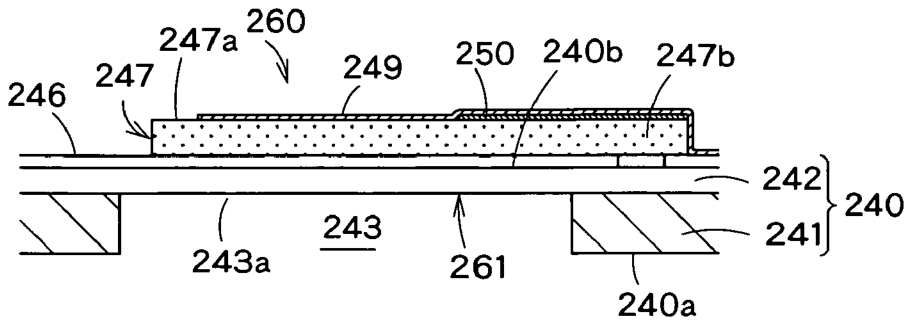
FIG. 12 is a sectional view showing a modification of the liquid-detecting device shown in FIGS. 10, 11A, and 11B.

As a modification of this embodiment, as shown in FIG. 12, between the extension part 249*b* of the upper electrode 249 and the piezoelectric layer 247, an insulating layer 250 may be arranged. By the existence of the insulating layer 250, the range of the part of the overall piezoelectric layer 247 where the piezoelectric effect is produced becomes circular, thus the symmetry thereof is enhanced, and the generation of unnecessary vibration can be suppressed more.

Next, a liquid-detecting device according to still another embodiment of the present invention and an ink cartridge (liquid container) having the liquid-detecting device will be explained by referring to the drawings.

Figure 13:
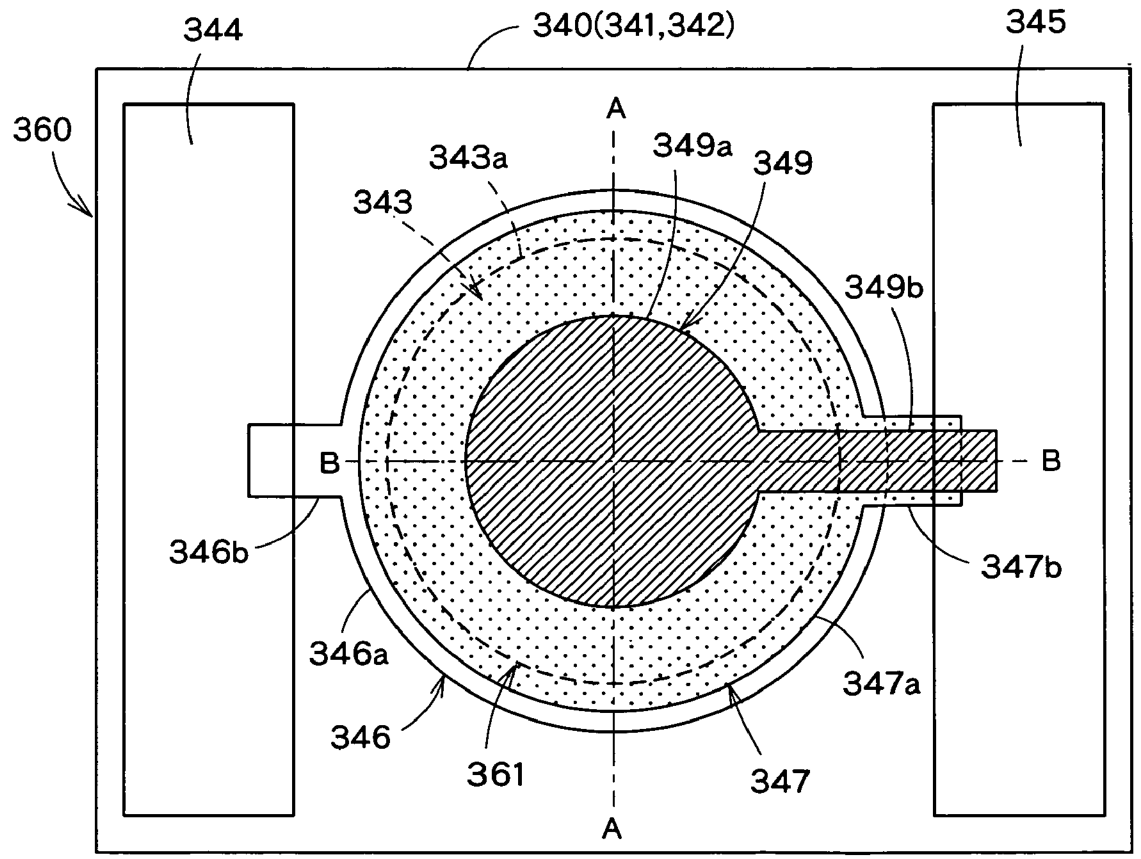
FIG. 13 is a plan view showing a liquid-detecting device of an embodiment of the present invention.
Figure 14A:
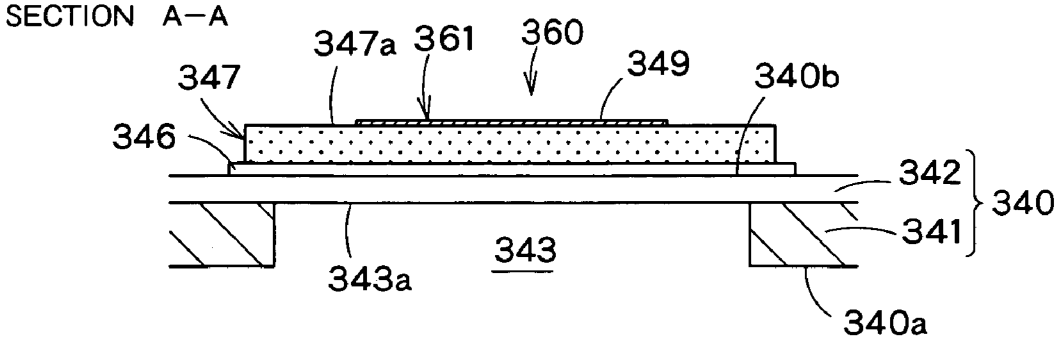
FIGS. 14A and 14B are vertical sectional views showing an enlarged part of the liquid-detecting device shown in FIG. 13.
Figure 14B:
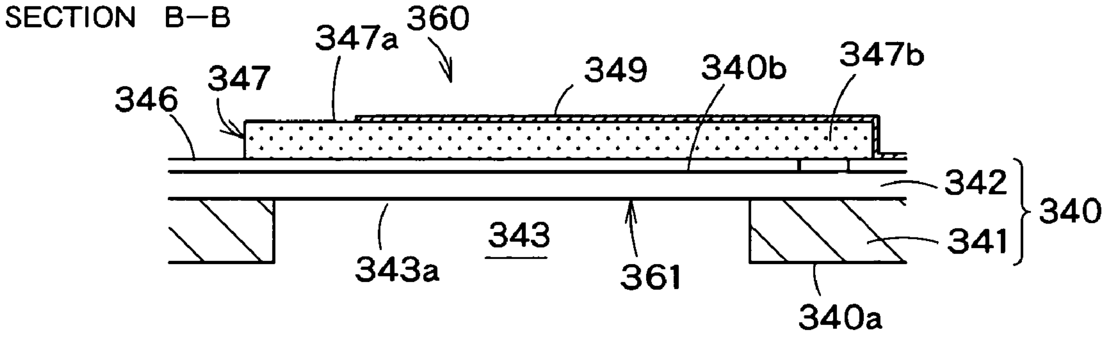

FIGS. 13, 14A, and 14B are drawings showing a liquid-detecting device 360 of this embodiment, and the liquid-detecting device 360 has a base 340 formed by laminating a vibration plate 342 on a substrate 341, and the base 340 has a first face 340*a* and a second face 340*b* opposite to each other. On the base 340, a circular cavity (concavity) 343 for receiving a medium to be detected is formed so as to be opened on the side of the first face 340*a* and a bottom 343*a* of the cavity 343 is configured to be capable of vibrating by the vibration plate 342. In other words, the part of the overall vibration plate 342 which vibrates actually is defined at the contour thereof by the cavity 343. At both ends of the base 340 on the side of the second face 340*b*, a lower electrode terminal 344 and an upper electrode terminal 345 are formed.

On the second face 340*b* of the base 340, a lower electrode (first electrode) 346 is formed and the lower electrode 346 has a circular main portion 346*a* and an extension part 346*b* which extends from the main portion 346*a* toward the lower electrode terminal 344 and is connected to the lower electrode terminal 344. The center of the circular main portion 346*a* of the lower electrode 346 coincides with the center of the cavity 343.

The circular main portion 346*a* of the lower electrode 346 is formed in a diameter larger than that of the circular cavity 343 and covers overall the area corresponding to the cavity 343.

On the lower electrode 346, a piezoelectric layer 347 is laminated and the piezoelectric layer 347 has a circular main portion 347*a* which is formed in a diameter larger than that of the cavity 343 and covers overall the area corresponding to the cavity 343 and an extension part 347*b* extending from the main portion 347*a*.

On the piezoelectric layer 347, a circular main portion 349*a* of an upper electrode (second electrode) 349 is laminated and the main portion 349*a* of the upper electrode 349 is formed in a diameter smaller than that of the cavity 343 and is arranged within the area corresponding to the cavity 343. Further, the upper electrode 349 has an extension part 349*b* which extends from the main portion 349*a* and extends on the main portion 347*a* and the extension part 347*b* of the piezoelectric layer 347. The extension part 349*b* extends beyond the extension part 347*b* of the piezoelectric layer 347 and is connected to the upper electrode terminal 345.

As mentioned above, the main portion 347*a* of the piezoelectric layer 347 is structured so as to be held by the main portion 349*a* of the upper electrode 349 and the main portion 346*a* of the lower electrode 346. By doing this, the piezoelectric layer 347 can be driven to effectively deform.

As mentioned above, the main portion 349*a* of the upper electrode 349 is formed in a diameter smaller than that of the main portion 347*a* of the piezoelectric layer 347. On the other hand, the main portion 346*a* of the lower electrode 346 covers overall the main portion 347*a* of the piezoelectric layer 347. Therefore, the main portion 349*a* of the upper electrode 349 decides the area of the part of overall the piezoelectric layer 347 where the piezoelectric effect is produced.

Further, the members included in the liquid-detecting device 360 are preferably formed integrally with each other by mutual calcination. When the liquid-detecting device 360 is integrally formed like this, the liquid-detecting device 360 can be handled easily.

As a material of the piezoelectric layer 347, it is preferable to use zirconium acid titanate (PZT), zirconium acid titanate lantern (PLZT), or a lead-less piezoelectric film using no lead. As a material of the substrate 341, it is preferable to use zirconia or alumina. Further, the vibration plate 342 preferably uses the same material as that of the substrate 341. The upper electrode 349, the lower electrode 346, the upper electrode terminal 345, and the lower electrode terminal 344 can use a conductive material, for example, metals of gold, silver, copper, platinum, aluminum, and nickel.

With respect to the main portion 347*a* of the piezoelectric layer 347, the main portion 349*a* of the upper electrode 349, and the main portion 346*a* of the lower electrode 346, the centers thereof coincide with the center of the cavity 343.

Further, the center of the circular cavity 343 for deciding the vibratable part of the vibration plate 342 is positioned at the center of the overall liquid-detecting device 360.

The vibratable part of the vibration plate 342 specified by the cavity 343, the part of the main portion 346*a* of the lower electrode 346 corresponding to the cavity 343, the part of the main portion 347*a* of the piezoelectric layer 347 corresponding to the cavity 343, and the main portion 349*a* and the part of the extension part 349*b* of the upper electrode 349 corresponding to the cavity 343 constitute the vibration part 361 of the liquid-detecting device 360. And, the center of the vibration part 361 of the liquid-detecting device 360 coincides with the center of the liquid-detecting device 360.

Furthermore, the main portion 347*a* of the piezoelectric layer 347, the main portion 349*a* of the upper electrode 349, the main portion 346*a* of the lower electrode 346, and the vibratable part (that is, the part corresponding to the bottom 343*a* of the cavity 343) of the vibration plate 342 are circular, so that the vibration part 361 of the liquid-detecting device 360 is almost symmetrical about the center of the liquid-detecting device 360.

As mentioned above, in this embodiment, the overall area corresponding to the cavity 343 is covered by the main portion 346*a* of the lower electrode 346 and the main portion 347*a* of the piezoelectric layer 347, so that the difference between the deformation mode at the time of forcible vibration and the deformation mode at the time of free vibration is reduced compared with the conventional art. Further, the vibration part 361 of the liquid-detecting device 360 is almost symmetrical about the center of the liquid-detecting device 360, so that the rigidity of the vibration part 361 is almost isotropic viewed from the center.

Therefore, generation of an unnecessary vibration caused by the asymmetrical structure is suppressed and the reduction in the output of the counter electromotive force due to the difference in the deformation mode between the time of forcible vibration and the time of free vibration is prevented. By doing this, the detection accuracy of the resonance frequency of the residual vibration of the vibration part 361 of the liquid-detecting device 360 is improved and the residual vibration of the vibration part 361 can be detected easily.

Further, the overall area corresponding to the cavity 343 is covered by the main portion 346*a* of the lower electrode 346 having a diameter larger than that of the cavity 343, so that the generation of an unnecessary vibration due to the displacement of the lower electrode 346 during manufacture is prevented and the reduction in the detection accuracy can be prevented.

Further, the area of contact between the vibration part 361 of the liquid-detecting device 360 and a liquid is limited to the area of existence of the cavity 343, so that it is possible to detect a liquid at a pin point, thus the ink level in the ink cartridge 7 can be detected with high accuracy.

Figure 15:
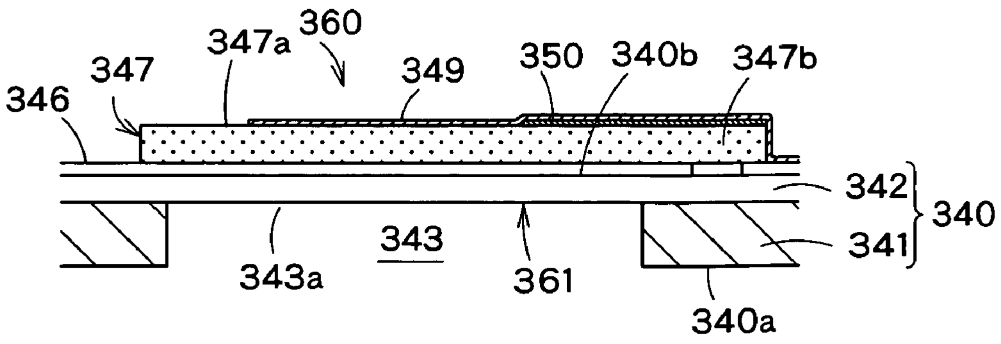
FIG. 15 is a sectional view showing a modification of the liquid-detecting device shown in FIGS. 13, 14A, and 14B.

As a modification of this embodiment, as shown in FIG. 15, between the extension part 349*b* of the upper electrode 349 and the piezoelectric layer 347, an insulating layer 350 may be arranged. By the existence of the insulating layer 350, the range of the part of the overall piezoelectric layer 347 where the piezoelectric effect is produced becomes circular, thus the symmetry thereof is enhanced, and the generation of unnecessary vibration can be suppressed more.

Next, a liquid-detecting device according to a further embodiment of the present invention and an ink cartridge (liquid container) having the liquid-detecting device will be explained by referring to the drawings.

Figure 16:
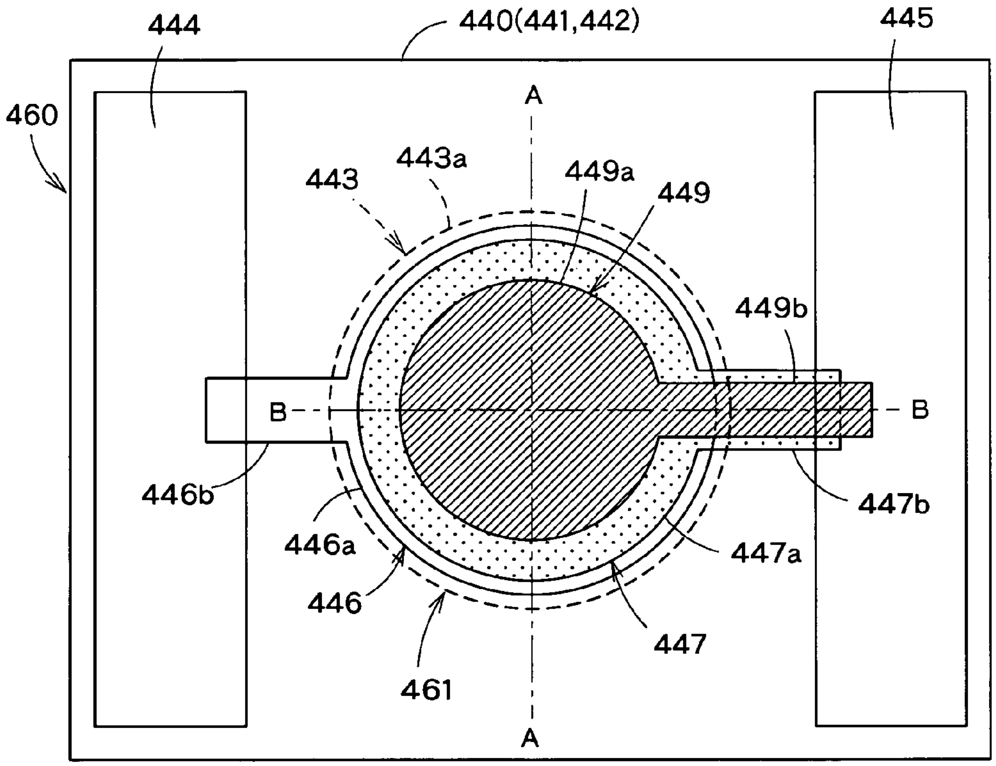
FIG. 16 is a plan view showing a liquid-detecting device of an embodiment of the present invention.
Figure 17A:
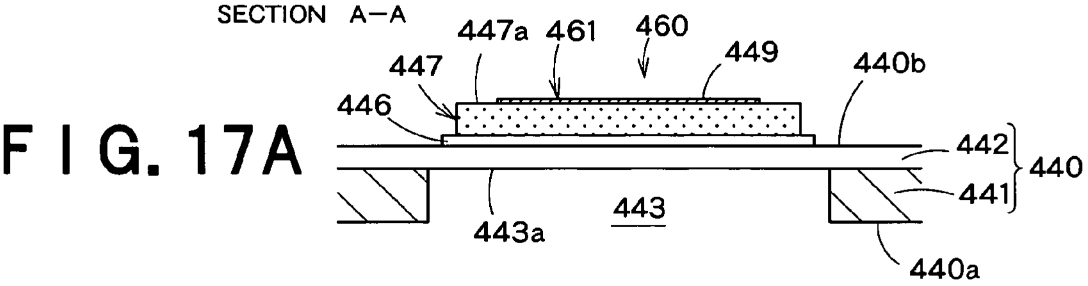
FIGS. 17A and 17B are vertical sectional views showing an enlarged part of the liquid-detecting device shown in FIG. 16.
Figure 17B:
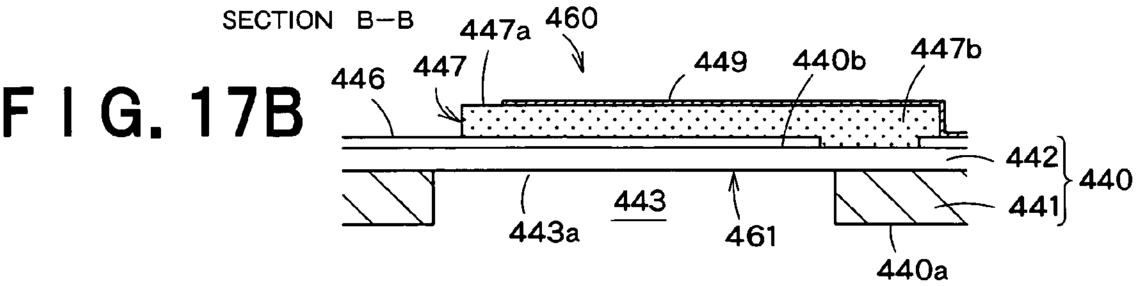

FIGS. 16, 17A, and 17B are drawings showing a liquid-detecting device 460 of this embodiment, and the liquid-detecting device 460 has a base 440 formed by laminating a vibration plate 442 on a substrate 441, and the base 440 has a first face 440*a* and a second face 440*b* opposite to each other. On the base 440, a circular cavity (concavity) 443 for receiving a medium to be detected is formed so as to be opened on the side of the first face 440*a* and a bottom 443*a* of the cavity 443 is configured to be capable of vibrating by the vibration plate 442. In other words, the part of the overall vibration plate 442 which vibrates actually is defined at the contour thereof by the cavity 443. At both ends of the base 440 on the side of the second face 440*b*, a lower electrode terminal 444 and an upper electrode terminal 445 are formed.

On the second face 440*b* of the base 440, a lower electrode (first electrode) 446 is formed and the lower electrode 446 has a circular main portion 446*a* and an extension part 446*b* which extends from the main portion 446*a* toward the lower electrode terminal 444 and is connected to the lower electrode terminal 444. The center of the circular main portion 446*a* of the lower electrode 446 coincides with the center of the cavity 443.

The circular main portion 446*a* of the lower electrode 446 is formed in a diameter smaller than that of the circular cavity 443 and is arranged within the area corresponding to the cavity 443. The diameter of the main portion 446*a* of the lower electrode 446 is preferably equal to or more than 75% of the diameter of the cavity 443.

On the main portion 446*a* of the lower electrode 446, a circular main portion 447*a* of a piezoelectric layer 447 is laminated and the main portion 447*a* of the piezoelectric layer 447 has a smaller diameter than that of the main portion 446*a* of the lower electrode 446. An extension part 447*b* extends from the main portion 447*a* of the piezoelectric layer 447 and the extension part 447*b* of the piezoelectric layer 447 extends up to the outside of the area corresponding to the cavity 443.

On the main portion 447*a* of the piezoelectric layer 447, a circular main portion 449*a* of an upper electrode (second electrode) 449 is laminated and the main portion 449*a* of the upper electrode 449 is formed in a diameter smaller than that of the main portion 447*a* of the piezoelectric layer 447. Further, the upper electrode 449 has an extension part 449*b* which extends from the main portion 449*a* and extends on the main portion 447*a* and the extension part 447*b* of the piezoelectric layer 447. The extension part 449*b* extends beyond the extension part 447*b* of the piezoelectric layer 447 and is connected to the upper electrode terminal 445.

As mentioned above, the main portion 447*a* of the piezoelectric layer 447 is structured so as to be held by the main portion 449*a* of the upper electrode 449 and the main portion 446*a* of the lower electrode 446. By doing this, the piezoelectric layer 447 can be driven to effectively deform.

As mentioned above, the main portion 449*a* of the upper electrode 449 is formed in a diameter smaller than that of the main portion 447*a* of the piezoelectric layer 447. On the other hand, the main portion 446*a* of the lower electrode 446 covers overall the main portion 447*a* of the piezoelectric layer 447. Therefore, the main portion 449*a* of the upper electrode 449 decides the area of the part of overall the piezoelectric layer 447 where the piezoelectric effect is produced.

Further, the members included in the liquid-detecting device 460 are preferably formed integrally with each other by mutual calcination. When the liquid-detecting device 460 is integrally formed like this, the liquid-detecting device 460 can be handled easily.

As a material of the piezoelectric layer 447, it is preferable to use zirconium acid titanate (PZT), zirconium acid titanate lantern (PLZT), or a lead-less piezoelectric film using no lead. As a material of the substrate 441, it is preferable to use zirconia or alumina. Further, the vibration plate 442 preferably uses the same material as that of the substrate 441. The upper electrode 449, the lower electrode 446, the upper electrode terminal 445, and the lower electrode terminal 444 can use a conductive material, for example, metals of gold, silver, copper, platinum, aluminum, and nickel.

With respect to the main portion 447*a* of the piezoelectric layer 447, the main portion 449*a* of the upper electrode 449, and the main portion 446*a* of the lower electrode 446, the centers thereof coincide with the center of the cavity 443. Further, the center of the circular cavity 443 for deciding the vibratable part of the vibration plate 442 is positioned at the center of the overall liquid-detecting device 460.

The vibratable part of the vibration plate 442 specified by the cavity 443, the main portion 446*a* and the part of the extension part 446*b* of the lower electrode 446 corresponding to the cavity 443, and the main portion 447*a* and the part of the extension part 447*b* of the piezoelectric layer 447 corresponding to the cavity 443, and the main portion 449*a* and the part of the extension part 449*b* of the upper electrode 449 corresponding to the cavity 443 constitute the vibration part 461 of the liquid-detecting device 460. And, the center of the vibration part 461 of the liquid-detecting device 460 coincides with the center of the liquid-detecting device 460.

Furthermore, the main portion 447*a* of the piezoelectric layer 447, the main portion 449*a* of the upper electrode 449, the main portion 446*a* of the lower electrode 446, and the vibratable part (that is, the part corresponding to the bottom 443*a* of the cavity 443) of the vibration plate 442 are circular, so that the vibration part 461 of the liquid-detecting device 460 is almost symmetrical about the center of the liquid-detecting device 460.

As mentioned above, in this embodiment, the main portion 446*a* of the lower electrode 446 is formed in a diameter larger than that of the main portion 447*a* of the piezoelectric layer 447 and the area corresponding to the cavity 443 is covered by the main portion 446*a* of the lower electrode 446 within the wide range, so that the area of the thin part not covered by the main portion 446*a* of the lower electrode 446 becomes smaller. Therefore, during free vibration of the vibration part after forcible deformation, an unnecessary high order of vibration mode other than the vibration frequency necessary as a detection object can be prevented from excitation. Further, the phenomenon that only the thin part is greatly changed during free vibration, and the deformation amount of the piezoelectric layer 447 becomes smaller, and the output of the counter electromotive force is reduced is prevented and the difference between the deformation mode at the time of forcible vibration and the deformation mode at the time of free vibration is reduced compared with the conventional art.

As mentioned above, according to this embodiment, the generation of an unnecessary vibration caused by the asymmetrical structure is suppressed and the reduction in the output of the counter electromotive force due to the difference in the deformation mode between the time of forcible vibration and the time of free vibration is prevented. By doing this, the detection accuracy of the resonance frequency of the residual vibration of the vibration part 461 of the liquid-detecting device 460 is improved and the residual vibration of the vibration part 461 can be detected easily.

Further, the main portion 447*a* of the piezoelectric layer 447 laminated on the main portion 446*a* of the lower electrode 446 is formed in a diameter smaller than that of the main portion 446*a* of the lower electrode 446, and the main portion 449*a* of the upper electrode 449 laminated on the main portion 447*a* of the piezoelectric layer 447 is formed in a diameter smaller than that of the main portion 447*a* of the piezoelectric layer 447, thereby, the part (for example, the main portion 447*a* of the piezoelectric layer 447) formed later at the manufacture step has a smaller diameter than that of the part (for example, the main portion 446*a* of the lower electrode 446) formed earlier. Therefore, by confirming the position of the part formed earlier to the end, the next part can be formed, so that the positioning during lamination can be performed accurately.

Further, the main portion 446*a* of the lower electrode 446 is formed in a diameter larger than that of the main portion 447*a* of the piezoelectric layer 447, thereby, the periphery of the main portion 446*a* of the lower electrode 446 can be brought close to the periphery of the bottom 443*a* of the cavity 443, thus the area of the thin part not covered by the main portion 446*a* of the lower electrode 446 can be made smaller.

Further, the area of contact between the vibration part 461 of the liquid-detecting device 460 and a liquid is limited to the area of existence of the cavity 443, so that it is possible to detect a liquid at a pin point, thus the ink level in the ink cartridge 7 can be detected with high accuracy.

Next, a liquid-detecting device according to a still further embodiment of the present invention and an ink cartridge (liquid container) having the liquid-detecting device will be explained by referring to the drawings.

Figure 18:
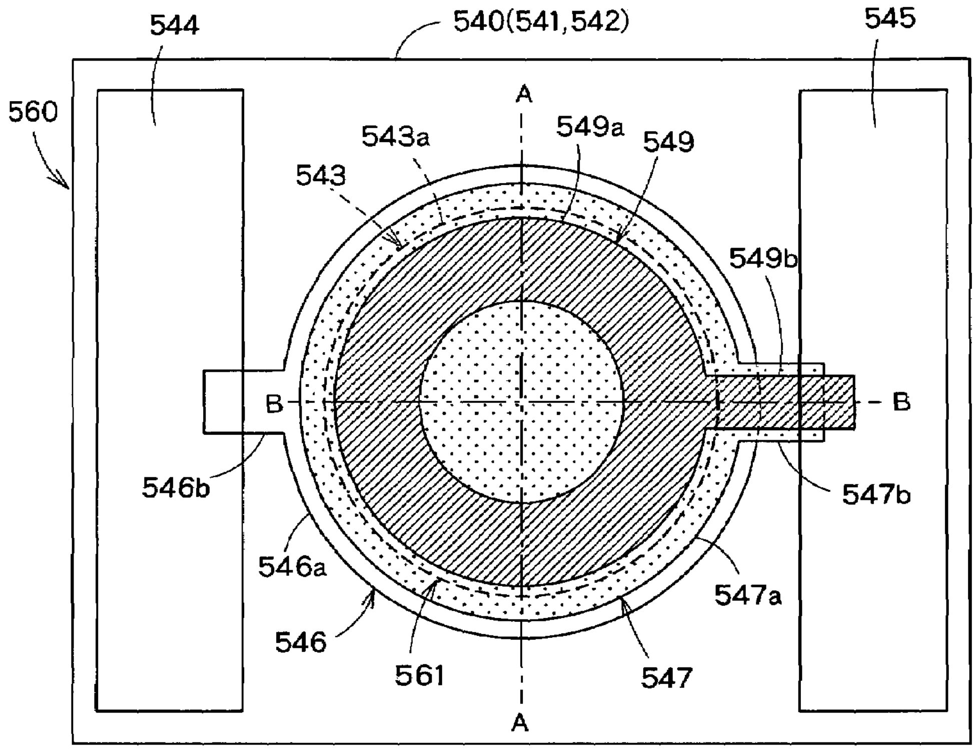
FIG. 18 is a plan view showing a liquid-detecting device of an embodiment of the present invention.
Figure 19A:
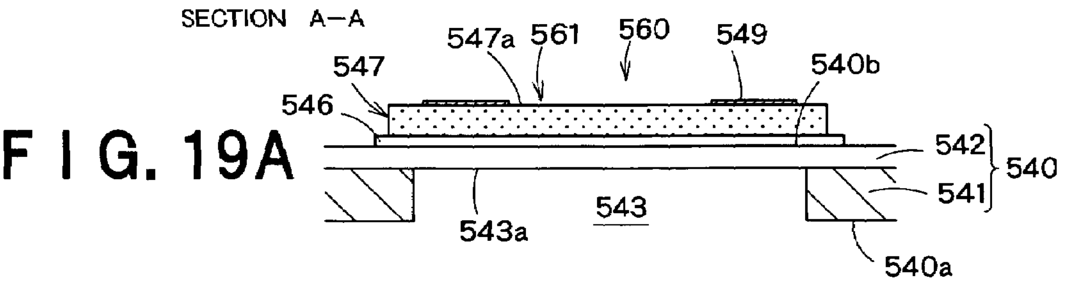
FIGS. 19A and 19B are vertical sectional views showing an enlarged part of the liquid-detecting device shown in FIG. 18.
Figure 19B:
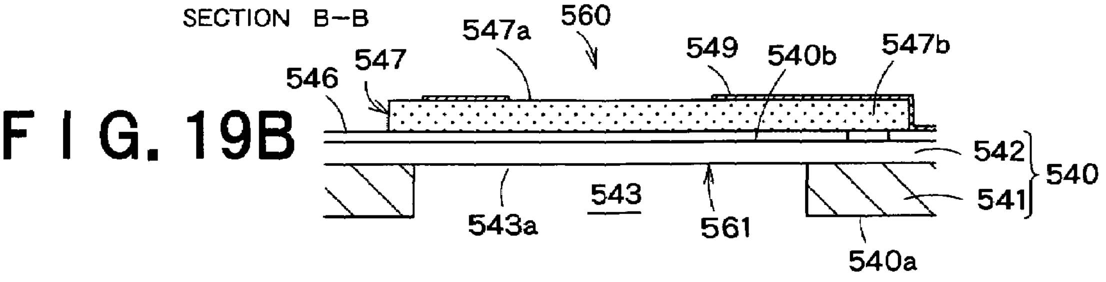

FIGS. 18, 19A, and 19B are drawings showing a liquid-detecting device 560 of this embodiment, and the liquid-detecting device 560 has a base 540 formed by laminating a vibration plate 542 on a substrate 541, and the base 540 has a first face 540*a* and a second face 540*b* opposite to each other. On the base 540, a circular cavity (concavity) 543 for receiving a medium to be detected is formed so as to be opened on the side of the first face 540*a* and a bottom 543*a* of the cavity 543 is configured to be capable of vibrating by the vibration plate 542. In other words, the part of the overall vibration plate 542 which vibrates actually is defined at the contour thereof by the cavity 543. At both ends of the base 540 on the side of the second face 540*b*, a lower electrode terminal 544 and an upper electrode terminal 545 are formed.

On the second face 540*b* of the base 540, a lower electrode (first electrode) 546 is formed and the lower electrode 546 has a circular main portion 546*a* and an extension part 546*b* which extends from the main portion 546*a* toward the lower electrode terminal 544 and is connected to the lower electrode terminal 544. The center of the circular main portion 546*a* of the lower electrode 546 coincides with the center of the cavity 543.

The circular main portion 546*a* of the lower electrode 546 is formed in a diameter larger than that of the circular cavity 543 and covers overall the area corresponding to the cavity 543.

On the lower electrode 546, a piezoelectric layer 547 is laminated and the piezoelectric layer 547 has a circular main portion 547*a* which is formed in a diameter larger than that of the cavity 543 and covers overall the area corresponding to the cavity 543 and an extension part 547*b* extending from the main portion 547*a*.

On the piezoelectric layer 547, a circular ring-shaped main portion 549*a* of an upper electrode (second electrode) 549 is laminated and the main portion 549*a* of the upper electrode 549 is formed in an outer diameter smaller than that of the cavity 543 and is arranged within the area corresponding to the cavity 543. Further, the upper electrode 549 has an extension part 549*b* which extends from the main portion 549*a* and extends on the main portion 547*a* and the extension part 547*b* of the piezoelectric layer 547. The extension part 549*b* extends beyond the extension part 547*b* of the piezoelectric layer 547 and is connected to the upper electrode terminal 545.

As mentioned above, the main portion 547*a* of the piezoelectric layer 547 is structured so as to be held by the main portion 549*a* of the upper electrode 549 and the main portion 546*a* of the lower electrode 546. By doing this, the piezoelectric layer 547 can be driven to effectively deform.

As mentioned above, the main portion 549*a* of the upper electrode 549 is formed in a diameter smaller than that of the main portion 547*a* of the piezoelectric layer 547. On the other hand, the main portion 546*a* of the lower electrode 546 covers overall the main portion 547*a* of the piezoelectric layer 547. Therefore, the main portion 549*a* of the upper electrode 549 decides the area of the part of overall the piezoelectric layer 547 where the piezoelectric effect is produced.

Further, the members included in the liquid-detecting device 560 are preferably formed integrally with each other by mutual calcination. When the liquid-detecting device 560 is integrally formed like this, the liquid-detecting device 560 can be handled easily.

As a material of the piezoelectric layer 547, it is preferable to use zirconium acid titanate (PZT), zirconium acid titanate lantern (PLZT), or a lead-less piezoelectric film using no lead. As a material of the substrate 541, it is preferable to use zirconia or alumina. Further, the vibration plate 542 preferably uses the same material as that of the substrate 541. The upper electrode 549, the lower electrode 546, the upper electrode terminal 545, and the lower electrode terminal 544 can be made with a conductive material, for example, metals of gold, silver, copper, platinum, aluminum, and nickel.

With respect to the main portion 547*a* of the piezoelectric layer 547, the main portion 549*a* of the upper electrode 549, and the main portion 546*a* of the lower electrode 546, the centers thereof coincide with the center of the cavity 543. Further, the center of the circular cavity 543 for deciding the vibratable part of the vibration plate 542 is positioned at the center of the overall liquid-detecting device 560.

The vibratable part of the vibration plate 542 specified by the cavity 543, the part of the main portion 546*a* of the lower electrode 546 corresponding to the cavity 543, and the part of the main portion 547*a* of the piezoelectric layer 547 corresponding to the cavity 543, and the main portion 549*a* and the part of the extension part 549*b* of the upper electrode 549 corresponding to the cavity 543 constitute the vibration part 561 of the liquid-detecting device 560. And, the center of the vibration part 561 of the liquid-detecting device 560 coincides with the center of the liquid-detecting device 560.

Furthermore, the main portion 547*a* of the piezoelectric layer 547, the main portion 549*a* of the upper electrode 549, the main portion 546*a* of the lower electrode 546, and the vibratable part (that is, the part corresponding to the bottom 543*a* of the cavity 543) of the vibration plate 542 are circular, so that the vibration part 561 of the liquid-detecting device 560 is almost symmetrical about the center of the liquid-detecting device 560.

Further, the vibration part 561 of the liquid-detecting device 560, when a voltage is applied to the piezoelectric layer 547 via the upper electrode 549 and the lower electrode 546, is projected and deformed in the opposite direction of the cavity 543.

As mentioned above, in this embodiment, the overall area corresponding to the cavity 543 is covered by the main portion 546*a* of the lower electrode 546 and the main portion 547*a* of the piezoelectric layer 547, so that the difference between the deformation mode at the time of forcible vibration and the deformation mode at the time of free vibration is reduced compared with the conventional art. Further, the vibration part 561 of the liquid-detecting device 560 is almost symmetrical about the center of the liquid-detecting device 560, so that the rigidity of the vibration part 561 is almost isotropic viewed from the center.

Further, the overall area corresponding to the cavity 543 is covered by the main portion 546*a* of the lower electrode 546 having a diameter larger than that of the cavity 543, so that the generation of an unnecessary vibration due to the displacement of the lower electrode 546 during manufacture is prevented and the reduction in the detection accuracy can be prevented.

Furthermore, the main portion 549*a* of the upper electrode 549 is formed in a circular ring shape, so that as shown in FIG. 18, the outer periphery of the main portion 549*a* of the upper electrode 549 can be arranged in the position close to the periphery of the cavity 543, thus the part of the extension part 549*b* of the upper electrode 549 positioning inside the area corresponding to the cavity 543 becomes smaller and the symmetry of the part constituting the vibration part 561 with respect to the upper electrode 549 is improved.

Therefore, the generation of an unnecessary vibration caused by the asymmetrical structure is suppressed and the reduction in the output of the counter electromotive force due to the difference in the deformation mode between the time of forcible vibration and the time of free vibration is prevented. By doing this, the detection accuracy of the resonance frequency of the residual vibration of the vibration part 561 of the liquid-detecting device 560 is improved and the residual vibration of the vibration part 561 can be detected easily.

Further, the area of contact between the vibration part 561 of the liquid-detecting device 560 and a liquid is limited to the area of existence of the cavity 543, so that it is possible to detect a liquid at a pin point, thus the ink level in the ink cartridge 7 can be detected with high accuracy.

Next, a liquid-detecting device according to still further embodiment of the present invention and an ink cartridge (liquid container) having the liquid-detecting device will be explained by referring to the drawings.

Figure 20:
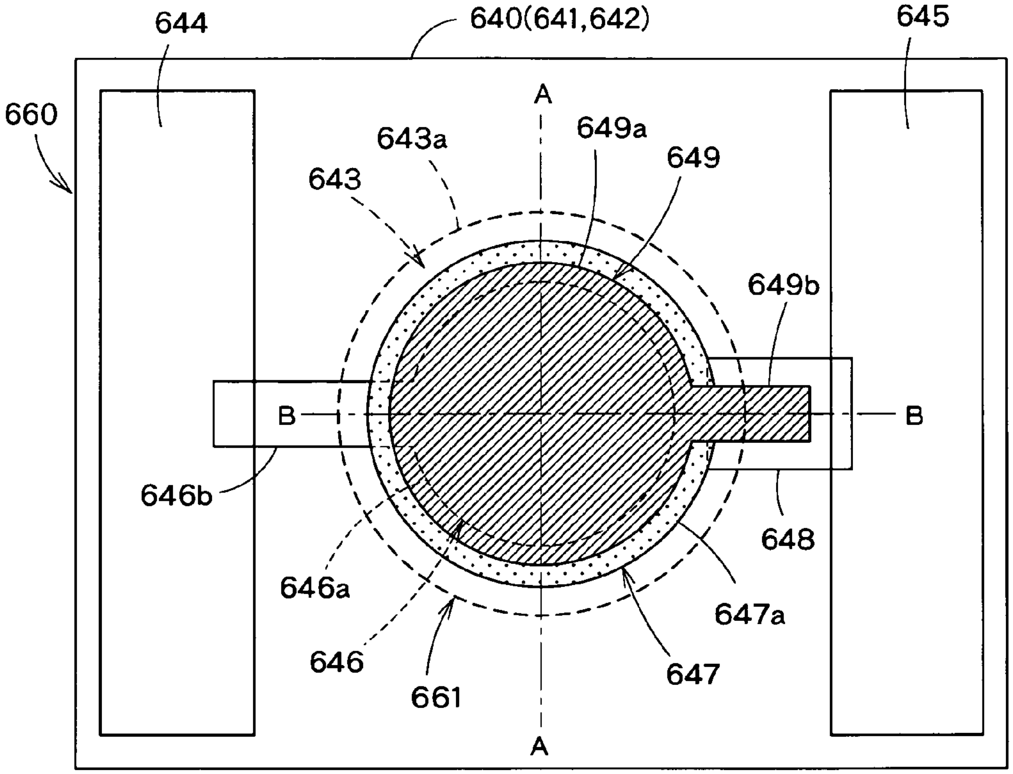
FIG. 20 is a plan view showing a liquid-detecting device of an embodiment of the present invention.
Figure 21A:
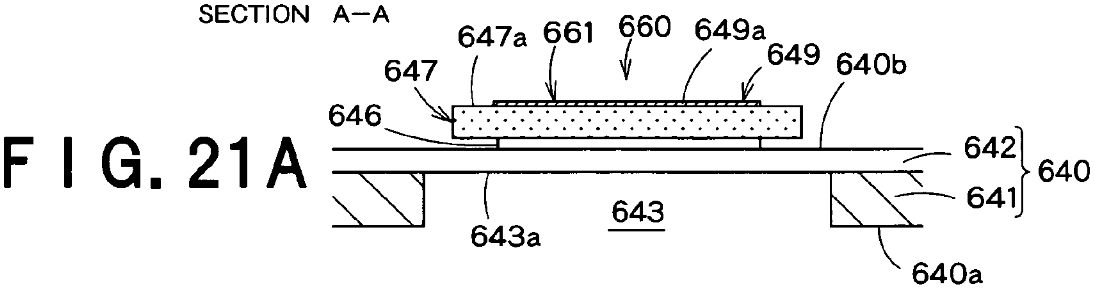
FIGS. 21A and 21B are vertical sectional views showing an enlarged part of the liquid-detecting device shown in FIG. 20.
Figure 21B:
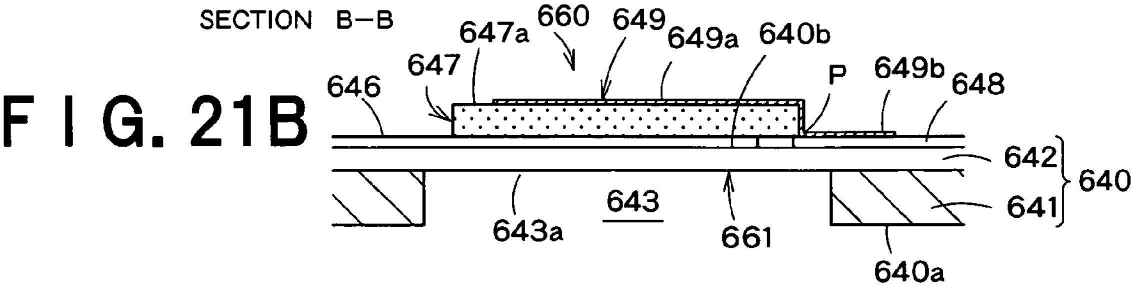

FIGS. 20, 21A, and 21B are drawings showing a liquid-detecting device 660 of this embodiment, and the liquid-detecting device 660 has a base 640 formed by laminating a vibration plate 642 on a substrate 641, and the base 640 has a first face 640*a* and a second face 640*b* opposite to each other. On the base 640, a circular cavity (concavity) 643 for receiving a medium to be detected is formed so as to be opened on the side of the first face 640*a* and a bottom 643*a* of the cavity 643 is configured to be capable of vibrating by the vibration plate 642. In other words, the part of the overall vibration plate 642 which vibrates actually is defined at the contour thereof by the cavity 643. At both ends of the base 640 on the side of the second face 640*b*, a lower electrode terminal 644 and an upper electrode terminal 645 are formed.

On the second face 640*b* of the base 640, a lower electrode (first electrode) 646 is formed and the lower electrode 646 has a circular main portion 646*a* and an extension part 646*b* which extends from the main portion 646*a* toward the lower electrode terminal 644 and is connected to the lower electrode terminal 644. The center of the circular main portion 646*a* of the lower electrode 646 coincides with the center of the cavity 643.

The circular main portion 646*a* of the lower electrode 646 is formed in a diameter smaller than that of the circular cavity 643 and is arranged within the area corresponding to the cavity 643.

On the lower electrode 646, a circular piezoelectric layer 647 formed in a diameter larger than that of the main portion 646*a* of the lower electrode 646 is laminated and as shown in FIG. 20, the overall piezoelectric layer 647 is arranged within the area corresponding to the cavity 643. In other words, the piezoelectric layer 647 has no part extending across the position corresponding to the periphery 643*a* of the cavity 643 yet.

On the side of the second face 640*b* of the base 640, an auxiliary electrode 648, one end of which is connected to the upper electrode terminal 645, is formed. The auxiliary electrode 648 extends from the outside of the area corresponding to the cavity 643 into the area corresponding to the cavity 643 beyond the position corresponding to the periphery 643*a* of the cavity 643. A part of the auxiliary electrode 648, in the area corresponding to the cavity 643, supports a part of the piezoelectric layer 647 from the side of the second face 640*b* of the base 640. The auxiliary electrode 648 preferably has the same material and same thickness as those of the lower electrode 646. Since a part of the piezoelectric layer 647 is supported by the auxiliary electrode 648 from the side of the second face 640*b* of the base 640 like this, the piezoelectric layer 47 is prevented from generation of a level different portion, thus the mechanical strength can be prevented from reduction.

On the piezoelectric layer 647, a circular main portion 649*a* of an upper electrode (second electrode) 649 is laminated and the upper electrode 649 is formed in a diameter smaller than that of the piezoelectric layer 647 and larger than that of the main portion 646*a* of the lower electrode 646. Further, the upper electrode 649 has an extension part 649*b* which extends from the main portion 649*a* and is connected to the auxiliary electrode 648. As shown in FIG. 21B, the position P where the extension part 649*b* of the upper electrode 649 and the auxiliary electrode 648 begin to connect is within the area corresponding to the cavity 643.

As shown in FIG. 20, the upper electrode 649 is electrically connected to the upper electrode terminal 645 via the auxiliary electrode 648. Since the upper electrode 649 is electrically connected to the upper electrode terminal 645 via the auxiliary electrode 648 like this, the level difference caused by the total thickness of the piezoelectric layer 647 and the lower electrode 646 can be absorbed by both the upper electrode 649 and the auxiliary electrode 648. Therefore, it can be prevented that a great level difference is caused in the upper electrode 649 so that the mechanical strength is reduced.

As shown in FIG. 20, the main portion 649*a* of the upper electrode 649 is circular and the center thereof coincides with the center of the cavity 643. The main portion 649*a* of the upper electrode 649 is formed in a diameter smaller than those of the piezoelectric layer 647 and the cavity 643.

As mentioned above, the piezoelectric layer 647 is structured so as to be held by the main portion 649*a* of the upper electrode 649 and the main portion 646*a* of the lower electrode 646. By doing this, the piezoelectric layer 647 can be driven to effectively deform.

Further, among the main portion 646*a* of the lower electrode 646 and the main portion 649*a* of the upper electrode 649 which are electrically connected to the piezoelectric layer 647, the main portion 646*a* of the lower electrode 646 is formed in a smaller diameter. Therefore, the main portion 646*a* of the lower electrode 646 decides the area of the part of the piezoelectric layer 647 where the piezoelectric effect is produced.

Further, the members included in the liquid-detecting device 660 are preferably formed integrally with each other by mutual calcination. When the liquid-detecting device 660 is integrally formed like this, the liquid-detecting device 660 can be handled easily.

As a material of the piezoelectric layer 647, it is preferable to use zirconium acid titanate (PZT), zirconium acid titanate lantern (PLZT), or a lead-less piezoelectric film using no lead. As a material of the substrate 641, it is preferable to use zirconia or alumina. Further, the vibration plate 642 preferably uses the same material as that of the substrate 641. The upper electrode 649, the lower electrode 646, the upper electrode terminal 645, and the lower electrode terminal 644 can be made with a conductive material, for example, metals of gold, silver, copper, platinum, aluminum, and nickel.

The vibratable part of the vibration plate 642 specified by the cavity 643, the main portion 646*a* and the part of the extension part 646 of the lower electrode 646 corresponding to the cavity 643, the piezoelectric layer 647, and the main portion 649*a* and the part of the extension part 649*b* of the upper electrode 649 corresponding to the cavity 643 constitute the vibration part 661 of the liquid-detecting device 660. And, the center of the vibration part 661 of the liquid-detecting device 660 coincides with the center of the liquid-detecting device 660.

Furthermore, the piezoelectric layer 647, the main portion 649*a* of the upper electrode 649, the main portion 646*a* of the lower electrode 646, and the vibratable part (that is, the part corresponding to the bottom 643*a* of the cavity 643) of the vibration plate 642 are circular, and the overall piezoelectric layer 647 is arranged within the area corresponding to the cavity 643, so that the vibration part 661 of the liquid-detecting device 660 is almost symmetrical about the center of the liquid-detecting device 660.

As mentioned above, in this embodiment, the vibration part 661 of the liquid-detecting device 660 is symmetrical about the center of the liquid-detecting device 660, thereby the rigidity of the vibration part 661 is almost isotropic viewed from the center. Especially, the piezoelectric layer 647 greatly affecting the rigidity of the vibration part 661 is formed in a circular shape, thereby the isotropy of the rigidity of the vibration part 661 is enhanced greatly. Therefore, the generation of an unnecessary vibration caused by the asymmetrical structure can be suppressed and the detection accuracy of the resonance frequency of the residual vibration of the vibration part 661 of the liquid-detecting device 660 is improved.

Further, the overall hard and fragile piezoelectric layer 647 is arranged within the area corresponding to the cavity 643 and the piezoelectric layer 647 does not exist in the position corresponding to the periphery 643*a* of the cavity 643. Therefore, the problem in the conventional liquid-detecting device that the piezoelectric film is cracked in the position corresponding to the periphery of the cavity can be solved.

Further, the area of contact between the vibration part 661 and a liquid is limited to the area of existence of the cavity 643, thereby it is possible to detect a liquid at a pin point, thus the ink level in the ink cartridge 7 can be detected with high accuracy.

Figure 22:
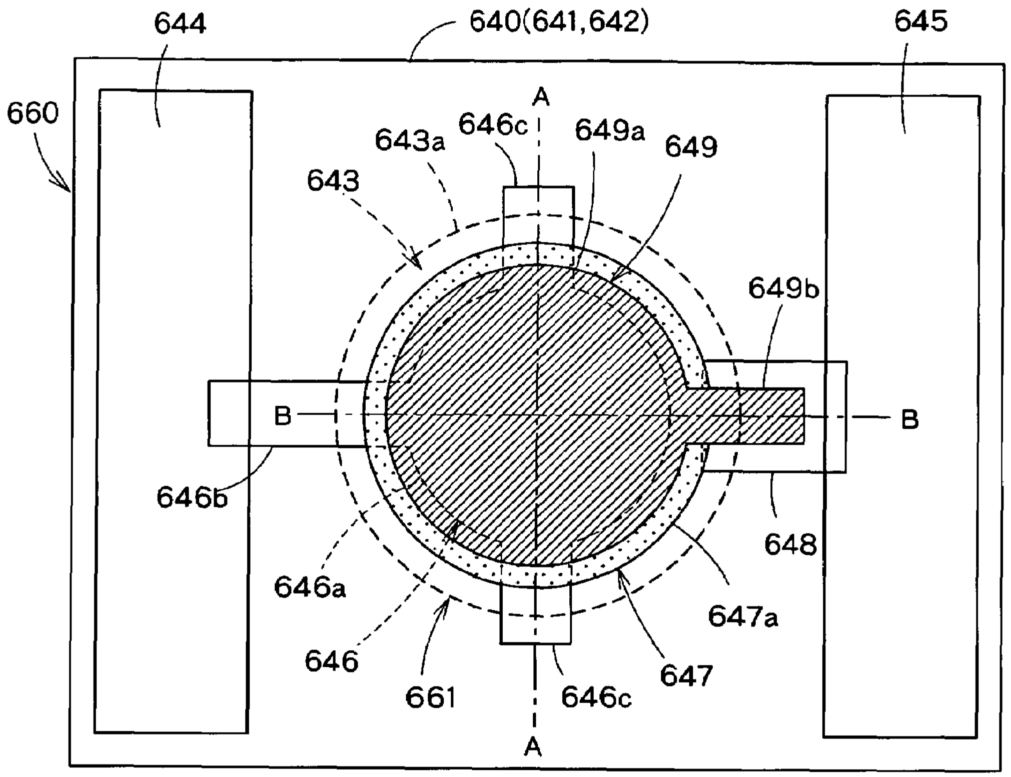
FIG. 22 is a plan view showing a liquid-detecting device as a modification of the embodiment shown in FIGS. 20, 21A, and 21B.
Figure 23A:
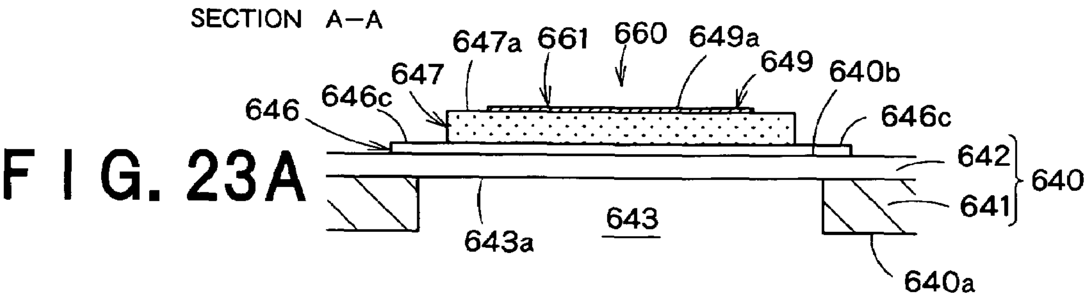
FIGS. 23A and 23B are vertical sectional views showing an enlarged part of the liquid-detecting device shown in FIG. 22.
Figure 23B:
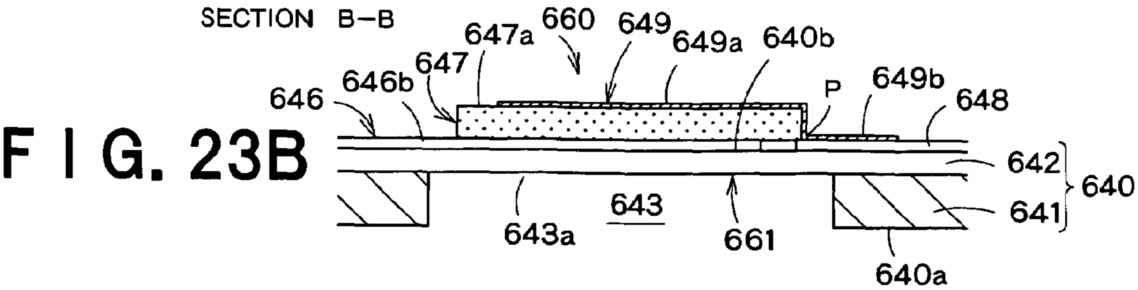
Figure 24C:
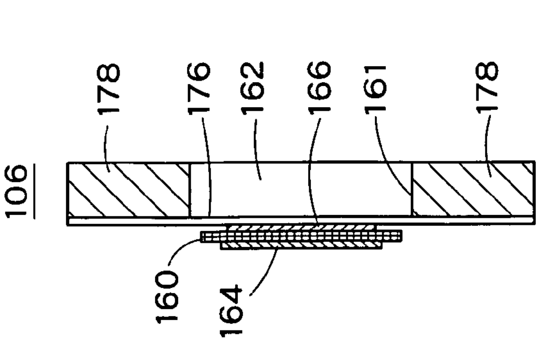
FIGS. 24A, 24B, and 24C are drawings showing a related liquid-detecting device.
Figure 24A:
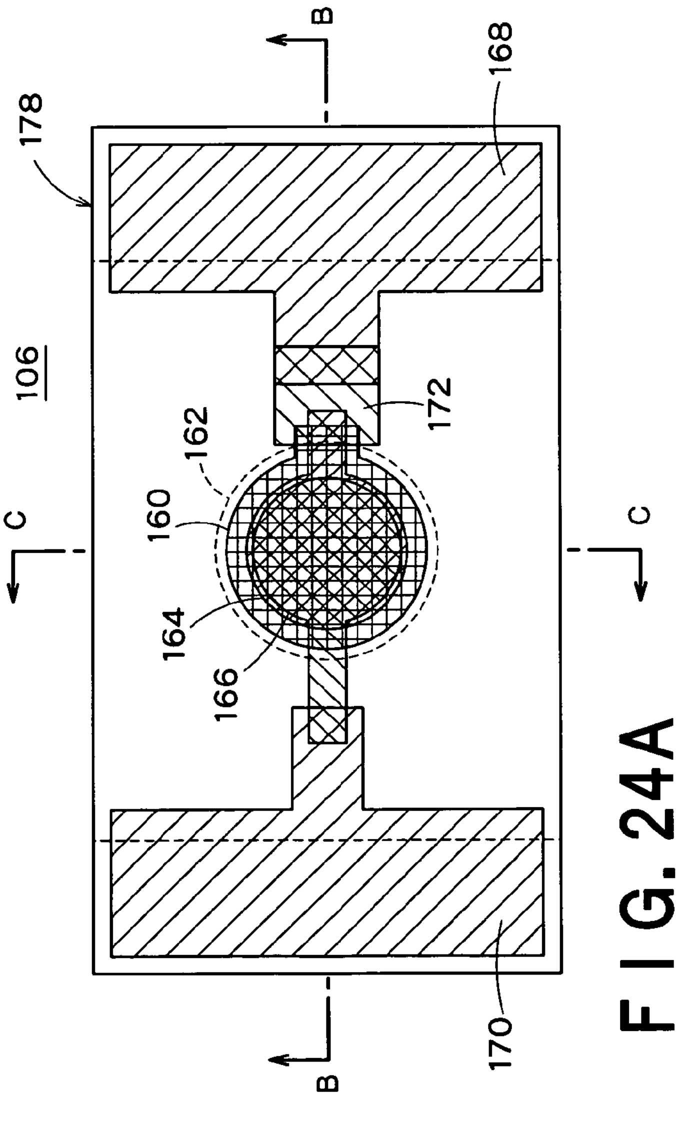
Figure 24B:
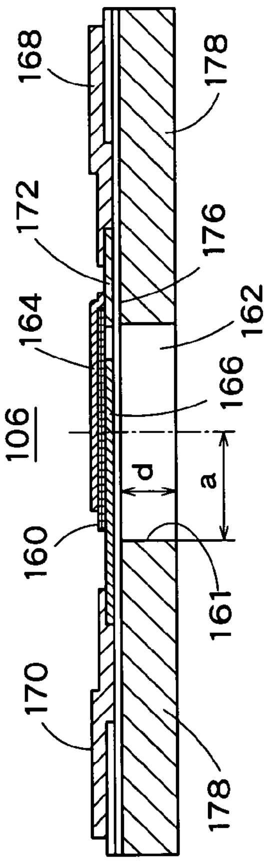

Further, as a modification of the aforementioned embodiment, as shown in FIGS. 22, 23A, and 23B, in addition to the extension part 646*b* of the lower electrode 646 and the extension part 649*b* of the upper electrode 649 which extend mutually in the opposite directions on a first straight line passing the center of the cavity 643, on a second straight line passing the center of the cavity 643 and crossing the first straight line at right angles, a pair of extension parts 646*c* extending mutually in the opposite directions from the main portion 646*a* of the lower electrode 646 can be formed.

Further, the pair of extension parts 646*c*, instead of continuously forming from the main portion 646*a* of the lower electrode 646, can be formed separately from the main portion 646*a* of the lower electrode 646.

As mentioned above, perpendicularly to the extending direction of the extension part 646*b* of the lower electrode 646 and the extension part 649*b* of the upper electrode 649, the pair of extension parts 646*c*, which do not function actually as an electrode, are arranged along the straight line passing the center of the cavity 643, thus, as compared with the embodiment shown in FIGS. 20, 21A, and 21B, the symmetry of the vibration part 661 is improved. Namely, in the embodiment shown in FIGS. 20, 21A, and 21B, the shape of the vibration part 661 is symmetrical two times, while in the embodiment shown in FIGS. 22, 23A, and 23B, the shape of the vibration part 661 is symmetrical four times. Since the symmetry of the shape of the vibration part 661 is improved like this, the generation of an unnecessary vibration can be reduced more.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

The invention claimed is:

1. A liquid-detecting device comprising:

a base having a first face and a second face opposite to each other, said base being provided with a concavity configured to receive a medium to be detected, said concavity being formed so as to be opened on a side of said first face, said concavity having a bottom configured to be capable of vibrating;

a first electrode formed on a side of said second face of said base, said first electrode having a main portion formed in a size larger than said bottom of said concavity so as to cover an almost overall area corresponding to said bottom of said concavity, said main portion including a notch formed so as to extend inward over a position corresponding to a periphery of said bottom of said concavity;

a piezoelectric layer having a main portion formed in a size smaller than said bottom of said concavity, a whole of said piezoelectric layer being arranged within said area corresponding to said bottom of said concavity, an almost overall said main portion of said piezoelectric layer excluding a part corresponding to said notch of said first electrode being laminated on said first electrode;

an auxiliary electrode formed on a side of said second face of said base so as to extend from an outside of said area corresponding to said bottom of said concavity to an inside of said area corresponding to said bottom of said concavity, a part of said auxiliary electrode being positioned within said notch of said first electrode and supporting a part of said piezoelectric layer from said side of said second face; and a second electrode having a main portion laminated on said piezoelectric layer and an extension part extending from said main portion of said second electrode so as to be connected to said auxiliary electrode within said area corresponding to said bottom of said concavity.

2. A liquid-detecting device according to claim 1, wherein said piezoelectric layer has a projection projected from said main portion of said piezoelectric layer within said area corresponding to said bottom of said concavity, said projection being supported by said auxiliary electrode.

3. A liquid-detecting device according to claim 1 or 2, wherein said main portion of said second electrode is formed in a size smaller than said main portion of said piezoelectric layer.

4. A liquid-detecting device according to claim 1 or 2, wherein said main portion of said piezoelectric layer and said main portion of said second electrode are formed in an almost symmetrical form having at least one symmetrical common axis.

5. A liquid-detecting device according to claim 4, wherein said main portion of said piezoelectric layer and said main portion of said second electrode are all circular and are arranged coaxially with each other.

6. A liquid-detecting device comprising:

a base having a first face and a second face opposite to each other, said base being provided with a concavity configured to receive a medium to be detected, said concavity being formed so as to be opened on a side of said first face, said concavity having a bottom configured to be capable of vibrating;

a first electrode formed in a size larger than said bottom of said concavity on a side of said second face of said base so as to cover an overall area corresponding to said bottom of said concavity;

a piezoelectric layer having a main portion formed in a size smaller than said bottom of said concavity, said main portion of said piezoelectric layer being laminated on said first electrode within said area corresponding to said bottom of said concavity; and a second electrode having a main portion laminated on said main portion of said piezoelectric layer.

7. A liquid-detecting device according to claim 6, wherein said piezoelectric layer additionally has an extension part extending from said main portion of said piezoelectric layer up to an outside of said area corresponding to said bottom of said concavity beyond a position corresponding to a periphery of said concavity.

8. A liquid-detecting device according to claim 6 or 7, wherein said main portion of said second electrode is formed in a size smaller than said main portion of said piezoelectric layer.

9. A liquid-detecting device according to claim 7, wherein said second electrode additionally has an extension part extending from said main portion of said second electrode over said extension part of said piezoelectric layer up to said outside of said area corresponding to said bottom of said concavity.

10. A liquid-detecting device according to claim 6 or 7, wherein said main portion of said piezoelectric layer and said main portion of said second electrode are formed in an almost symmetrical form having at least one symmetrical common axis.

11. A liquid-detecting device according to claim 10, wherein said concavity, said main portion of said piezoelectric layer, and said main portion of said second electrode are all circular and are arranged coaxially with each other.

12. A liquid-detecting device according to claim 6 or 7, further comprising an insulating layer arranged between said extension part of said second electrode and said piezoelectric layer.

13. A liquid-detecting device comprising:

a base having a first face and a second face opposite to each other, said base being provided with a concavity configured to receive a medium to be detected, said concavity being formed so as to be opened on a side of said first face, said concavity having a bottom configured to be capable of vibrating;

a first electrode formed in a size larger than said bottom of said concavity on a side of said second face of said base so as to cover an overall area corresponding to said bottom of said concavity;

a piezoelectric layer having a main portion formed in a size larger than said bottom of said concavity, said main portion of said piezoelectric layer being laminated on said first electrode so as to cover said overall area corresponding to said bottom of said concavity; and a second electrode having a main portion formed in a size smaller than said bottom of said concavity, said main portion of said second electrode being laminated on said main portion of said piezoelectric layer within said area corresponding to said bottom of said concavity.

14. A liquid-detecting device according to claim 13, wherein said main portion of said piezoelectric layer is formed in a size smaller than said main portion of said first electrode.

15. A liquid-detecting device according to claim 13 or 14, wherein:

said piezoelectric layer additionally has an extension part extending from said main portion of said piezoelectric layer, and said second electrode additionally has an extension part extending from said main part of said second electrode over said main portion of said piezoelectric layer and said extension part of said piezoelectric layer.

16. A liquid-detecting device according to claim 13 or 14, wherein the said main portion of said piezoelectric layer and said main portion of said second electrode are formed in an almost symmetrical form having at least one symmetrical common axis.

17. A liquid-detecting device according to claim 16, wherein said concavity and said main portion of said second electrode are all circular and are arranged coaxially with each other.

18. A liquid-detecting device according to claim 15, further comprising an insulating layer arranged between said extension part of said second electrode and said piezoelectric layer.

19. A liquid-detecting device comprising:

a base having a first face and a second face opposite to each other, said base being provided with a concavity configured to receive a medium to be detected, said concavity being formed so as to be opened on a side of said first face, said concavity having a bottom configured to be capable of vibrating;

a first electrode having a main portion formed in a size smaller than said bottom of said concavity on a side of said second face of said base, said main portion of said first electrode being arranged inside an area corresponding to said bottom of said concavity;

a piezoelectric layer having a main portion formed in a size smaller than said main portion of said first electrode, said main portion of said piezoelectric layer being laminated on said main portion of said first electrode; and a second electrode having a main portion formed in a size smaller than said main portion of said piezoelectric layer, said main portion of said second electrode being laminated on said main portion of said piezoelectric layer.

20. A liquid-detecting device according to claim 19, wherein:

said first electrode additionally has an extension part extending from said main portion of said first electrode up to an outside of said area corresponding to said bottom of said concavity, said piezoelectric layer additionally has an extension part extending from said main portion of said piezoelectric layer up to said outside of said area corresponding to said bottom of said concavity, and said second electrode additionally has an extension part extending from said main portion of said second electrode over said main portion of said piezoelectric layer and said extension part of said piezoelectric layer.

21. A liquid-detecting device according to claim 19 or 20, wherein:

said concavity and said main portion of said first electrode are all circular and are arranged coaxially with each other, and a diameter of said main portion of said first electrode is equal to or more than 75% of a diameter of said concavity.

22. A liquid-detecting device comprising:

a base having a first face and a second face opposite to each other, said base being provided with a concavity configured to receive a medium to be detected, said concavity being formed so as to be opened on a side of said first face, said concavity having a bottom configured to be capable of vibrating;

a first electrode formed in a size larger than said bottom of said concavity on a side of said second face of said base so as to cover an overall area corresponding to said bottom of said concavity;

a piezoelectric layer having a main portion formed in a size larger than said bottom of said concavity, said main portion of said piezoelectric layer being laminated on said first electrode so as to cover said overall area corresponding to said bottom of said concavity; and a second electrode having a annular main portion which has an outer diameter formed in a size smaller than said bottom of said concavity, said annular main portion being laminated on said main portion of said piezoelectric layer within said area corresponding to said bottom of said concavity.

23. A liquid-detecting device according to claim 22, wherein said main portion of said piezoelectric layer is formed in a size smaller than said main portion of said first electrode.

24. A liquid-detecting device according to claim 22 or 23, wherein:

said piezoelectric layer additionally has an extension part extending from said main portion of said piezoelectric layer, and said second electrode additionally has an extension part extending from said main part of said second electrode over said main portion of said piezoelectric layer and said extension part of said piezoelectric layer.

25. A liquid-detecting device according to claim 22 or 23, wherein said main portion of said piezoelectric layer and said main portion of said second electrode are formed in an almost symmetrical form having at least one symmetrical common axis.

26. A liquid-detecting device according to claim 25, wherein said concavity is circular, and said main portion of said second electrode is in a circular ring shape, and said concavity and said main portion of said second electrode are arranged coaxially with each other.

27. A liquid-detecting device comprising:

a base having a first face and a second face opposite to each other, said base being provided with a concavity configured to receive a medium to be detected, said concavity being formed so as to be opened on a side of said first face, said concavity having a bottom configured to be capable of vibrating;

a first electrode formed on a side of said second face of said base, said first electrode having a main portion and an extension part, said main portion being formed in a size smaller than said bottom of said concavity and arranged within an area corresponding to said bottom of said concavity, said extension part extending from said main part of said first electrode up to an outside of said area corresponding to said bottom of said concavity;

a piezoelectric layer formed in a size smaller than said bottom of said concavity, said piezoelectric layer being laminated on said first electrode, a whole of said piezoelectric layer being arranged within said area corresponding to said bottom of said concavity;

an auxiliary electrode formed on said side of said second face of said base, said auxiliary electrode extending from said outside of said area corresponding to said bottom of said concavity to an inside of said area corresponding to said bottom of said concavity, a part of said auxiliary electrode supporting a part of said piezoelectric layer from said side of said second face; and a second electrode having a main portion laminated on said piezoelectric layer and an extension part extending from said main portion of said second electrode so as to be connected to said auxiliary electrode within said area corresponding to said bottom of said concavity.

28. A liquid-detecting device according to claim 27, wherein said size of said main portion of said first electrode is smaller than said size of said piezoelectric layer, and a size of said main portion of said second electrode is larger than said size of said main portion of said first electrode.

29. A liquid-detecting device according to claim 27 or 28, wherein a size of said main portion of said second electrode is smaller than said size of said piezoelectric layer.

30. A liquid-detecting device according to any one of claim 27 or 28, wherein:

said extension part of said first electrode and said extension part of said second electrode extend mutually in opposite directions along a first straight line passing a center of said concavity, and said first electrode additionally has a pair of extension parts mutually extending from said main portion of said first electrode in opposite directions along a second straight line which passes said center of said concavity and intersects said first straight line orthogonally.

31. A liquid-detecting device according to claim 30, wherein said pair of extension parts and said main portion of said first electrode are separated from each other.

32. A liquid-detecting device according to claim 27 or 28, wherein said main portion of said first electrode, said main portion of said piezoelectric layer, and said main portion of said second electrode are all circular and arranged coaxially with each other.

33. A liquid container comprising:

a container body for storing a liquid; and a liquid-detecting device as defined in any one of claims 1, 2, 6, 7, 9, 13, 14, 19, 20, 22, 23, 27 or 28, wherein said concavity of said liquid-detecting device is exposed in a liquid storage space of said container body.

34. A liquid container according to claim 33, wherein a liquid for a liquid ejecting apparatus is stored in said container body.

35. A liquid container according to claim 34, wherein said liquid ejecting apparatus is an ink jet recording apparatus and ink is stored in said container body.

* * * * *